(12) United States Patent
Brooks et al.

(10) Patent No.: US 7,802,286 B2
(45) Date of Patent: Sep. 21, 2010

(54) METHODS AND APPARATUS FOR FORMAT SELECTION FOR NETWORK OPTIMIZATION

(75) Inventors: Paul D. Brooks, Weddington, NC (US); Remi Rieger, Charlotte, NC (US)

(73) Assignee: Time Warner Cable Inc., New York, NY (US)

( * ) Notice: Subject to any disclaimer, the term of this patent is extended or adjusted under 35 U.S.C. 154(b) by 508 days.

(21) Appl. No.: 11/880,945

(22) Filed: Jul. 24, 2007

(65) Prior Publication Data

US 2009/0031384 A1  Jan. 29, 2009

(51) Int. Cl.
*H04N 7/10* (2006.01)
*H04N 7/025* (2006.01)
*H04N 7/173* (2006.01)

(52) U.S. Cl. .............. 725/96; 725/32; 725/35; 725/86; 725/87; 725/95; 725/98; 725/101; 725/105; 725/116

(58) Field of Classification Search .......... 725/86, 725/87, 98, 101, 32, 35, 95, 96, 105, 116
See application file for complete search history.

(56) References Cited

U.S. PATENT DOCUMENTS

| | | | |
|---|---|---|---|
| 5,862,312 A | 1/1999 | Mann et al. | |
| 5,886,995 A * | 3/1999 | Arsenault et al. | 370/477 |
| 6,124,878 A | 9/2000 | Adams et al. | |
| 6,169,728 B1 | 1/2001 | Perreault et al. | |
| 6,211,901 B1 | 4/2001 | Imajima et al. | |
| 6,898,800 B2 * | 5/2005 | Son et al. | 725/93 |
| 7,181,760 B1 | 2/2007 | Wallace | |
| 7,207,055 B1 | 4/2007 | Hendricks et al. | |
| 7,266,726 B1 | 9/2007 | Ladd | |
| 7,283,782 B2 | 10/2007 | Sinnarajah | |
| 7,320,134 B1 | 1/2008 | Tomsen et al. | |
| 2002/0095684 A1 | 7/2002 | St. John et al. | |
| 2003/0023981 A1 * | 1/2003 | Lemmons | 725/109 |
| 2003/0056217 A1 | 3/2003 | Brooks | |
| 2003/0217365 A1 | 11/2003 | Caputo | |
| 2004/0226044 A1 | 11/2004 | Goode | |
| 2005/0114900 A1 | 5/2005 | Ladd | |
| 2005/0289618 A1 | 12/2005 | Hardin | |
| 2006/0036750 A1 | 2/2006 | Ladd | |
| 2006/0066632 A1 | 3/2006 | Wong | |
| 2006/0130107 A1 | 6/2006 | Gonder | |
| 2006/0171390 A1 | 8/2006 | La Joie | |
| 2007/0022459 A1 | 1/2007 | Gaebel | |
| 2007/0076728 A1 | 4/2007 | Rieger | |
| 2007/0204300 A1 | 8/2007 | Markley | |
| 2007/0204311 A1 | 8/2007 | Hasek | |
| 2007/0217436 A1 | 9/2007 | Markley | |
| 2007/0223380 A1 * | 9/2007 | Gilbert et al. | 370/235 |
| 2008/0192820 A1 | 8/2008 | Brooks et al. | |
| 2008/0273591 A1 | 11/2008 | Brooks | |
| 2009/0028182 A1 | 1/2009 | Brooks et al. | |

* cited by examiner

*Primary Examiner*—Dominic D Saltarelli
(74) *Attorney, Agent, or Firm*—Gazdzinski & Associates, PC

(57) ABSTRACT

Method and apparatus for optimizing network bandwidth utilization by delivering to users only the minimum number of programs required by service provider policies. In one embodiment, the method comprises switching some users from lower quality versions of programs to higher quality versions of the same programs, and removing those lower quality versions of programs from a given service group. In another embodiment, some users are switched from higher quality versions of programs to lower quality versions of those same programs, and the higher quality versions of programs removed from a given service group.

35 Claims, 15 Drawing Sheets

METHODS AND APPARATUS FOR FORMAT SELECTION FOR NETWORK OPTIMIZATION

RELATED APPLICATIONS

This application is related to co-pending U.S. patent application Ser. No. 11/881,034 filed contemporaneously herewith (Jul. 24, 2007) of the same title, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of optimizing the operation of a content-based network such as for example a cable or satellite network. More particularly, the present invention is in one exemplary aspect related to apparatus and methods for optimizing network bandwidth utilization by selective delivery of programs including specific versions or variants of those programs, and avoiding duplication of programming.

2. Description of Related Technology

Many networks including, for example, cable television or satellite networks, deliver digital audio/video programming to users. In all of these networks, capacity (typically described in terms of bandwidth) is limited. Often, at certain nodes or points within the network, "bottlenecks" can occur, wherein the output capacity of particular network nodes may at times be insufficient to accommodate the number of program streams that are requested by users "downstream" from those nodes.

As an example, a Broadcast Switched Architecture (BSA) cable television network such as that described in co-assigned application Ser. No. 09/956,688, entitled "Technique for Effectively Providing Program Material in a Cable Television System", incorporated herein by reference in its entirety, delivers only a subset of available programming to network subscribers in order to optimize bandwidth. Delivery of programming is typically based on customer requests for programming; however, bandwidth consumption may vary greatly during the day. In a fixed bandwidth model, the BSA architecture delivers a fixed amount of programming based on the fixed bandwidth constraint; the programming actually delivered at any given time will be only a fraction of the total of the programming available to the user base.

In a typical BSA environment such as that utilized by the assignee hereof, Standard Definition (SD) television resolution utilizes MPEG-2 encoding and quadrature amplitude (QAM) modulation, and enables carriage of a prescribed number (e.g., 10) SD sessions on one RF channel or QAM. Since a typical service group consists of 4 RF channels, 40 simultaneous SD sessions can be accommodated within such a service group.

More and more U.S. and international households are beginning to purchase High Definition (HD) televisions (HDTV). To keep up with the trend, multiple systems operators (MSOs) have begun offering a greater variety of HD television programs to cable customers, thereby allowing for greater subscriber utilization of the HD capability of their televisions, and ostensibly greater subscriber satisfaction.

Entertainment-quality transmission of HD signals requires about four times as much bandwidth as SD transmission. Although revenues from HD service may not be four times the revenue from SD service, the ability to offer HD service is often critical to cable operators' strategy to being a leader in digital television service offerings, and maintaining a high level of subscriber satisfaction (and low turnover).

In addition to HD signals, various forms or formats of content encoding are also becoming more prevalent within both content-delivery networks (and associated IP networks), and user devices associated therewith. For example, certain types of lossy encoding may be sufficient in certain applications, as may certain bitrates which are reduced from nominal or higher-quality bitrates for that codec (such as for portable devices which are unable to handle very high bitrate encodings, or which may have reduced resolution display capabilities that cannot make use of HD or other high-quality encodings). Different devices may simply utilize different formats as well, such as for example the use of AVCHD encoders particularly designed to reduce storage requirements for handheld video devices.

Moreover, so-called "up-conversion" systems are becoming more prevalent, such as where a given device is adapted to enhance a given bitrate or resolution of encoding (e.g., an SD program stream) to a higher resolution or quality; e.g., to provide "near-HD" quality based on an SD encoding.

Bitrates for various types of content may also be affected by the multiplexing and/or stuffing schemes employed. For example, in many existing systems, variable bitrate (VBR) digitally encoded program streams are converted to constant bitrate (CBR) program streams to facilitate multiplexing of those program streams to form higher rate streams more suitable for conveyance on a service provider's transmission facilities. A variable bitrate (VBR) stream may be converted to a CBR stream by reducing its bitrate when it exceeds a target CBR, or adding null bits to it ("stuffing") when its bitrate falls below the target CBR; this is referred to as "clamping" the stream. This clamping is performed by or after encoding, but before multiplexing the program stream with other program streams.

Hence there is a fairly broad spectrum of consumer premises equipment (CPE) that conceivably would be serviced by content-based networks, ranging from small, portable devices with relatively low bitrate interfaces, lower bitrate codecs and lower-resolution displays, to high-end residential or premises devices adapted to receive and utilize HD or other similar high-resolution or high-bitrate encodings. Some subscribers in the typical cable network for example might have only an SD receiver and television. Others may have an SD receiver, with "up-conversion" apparatus (e.g., the receiver, a DVR, or DVD player and an associated HDTV monitor). Yet others may have an SD and HD receiver and associated HDTV. While increasing the number of different environments and permutations of capabilities present within the MSO's network (and accordingly complexity), such a "patchwork" of heterogeneous CPE capabilities also potentially affords the MSO with opportunities for managing bandwidth consumption based on these differing capabilities.

Video consumption typically changes in two different manners: the first is by the number of different channels being consumed (for example, how many different program channels are being watched at any given time in a service group), and the second is by the type or nature of programming being requested; e.g., "long tail" (less popular) vs. popular, or highly compressible vs. not compressible (sports are often not compressible due to inter alia high rates of motion), and so forth. The current lineup or type of programming service can vary significantly from moment to moment. Nonetheless, the total number of individual programs being delivered over the network may remain the same. The actual consumption or use of those programs may vary through, for example, a twenty-four hour viewing period, and it may often be the case that one or more programs are not being viewed at any given time.

In a BSA environment, it is often not possible to ascertain with complete certainty whether a user or groups of users are viewing particular ones of the delivered programs, and thus the BSA environment must make certain assumptions about the demand for the available programs. Hence, under such circumstances, programming could be removed from service inadvertently when it was in fact being watched, or a user could maintain a connection to a certain program, stop viewing that program for a certain period of time without disabling the connection, and return to find that connection to that program or program channel no longer available.

Programs within the cable network may be unicast (i.e., where one user can view the content, such as in a VOD scenario), or multicast (two or more users can view the same content). During certain periods, an SD version of a program will be broadcast on one channel, and the HD counterpart thereof broadcast a second channel (SD/HD simulcast). During other periods, the SD version of a program will be broadcast on both channels (SD/SD simulcast).

On-demand (OD) service such as VOD is typically offered over a given number (e.g., 4) of RF channels from the available spectrum. Thus, an OD Service Group consists of homes receiving OD signals over the same 4 RF channels. Reasons for this grouping include (i) that it lends itself to a desirable "symmetry of two" design of products (e.g. Scientific Atlanta's MQAM), and (ii) a simple mapping from incoming Asynchronous Serial Interface (ASI) payload rate of 213 Mbps to four QAM payload rates.

From the discussion above, the need for effective and efficient allocation of the bandwidth within the network is evident. One such prior art function, called a Service Resource Manager (SRM), is used for allocating bandwidth based on OD session requests. When a new session (e.g., VOD) request is made, the SRM receives that request, allocates bandwidth on a downstream QAM channel, and sends the information back to the CPE that made the request so that it can tune to the right RF channel and the program therein. Since the SRM controls mapping of incoming session requests to QAM channels within the service group, it is an appropriate place for a Cable Operator to enforce RF channel usage policy. In general, the SRM should maximize availability of bandwidth to OD and other sessions (by efficiently recycling bandwidth from expired sessions) and by ensuring some level of redundancy in case of equipment failure (e.g. a QAM modulator goes down). The SRM function can be implemented at the edge or core of the network, in a VOD server, or elsewhere. Depending on where this function is implemented, it is variously referred to as NSG (Network Services Gateway) and SRM (Service Resource Manager).

For example, in a Scientific Atlanta network, the VOD server acts as the service resource manager and asks the Digital Network Control System (DNCS) for specific resources. The DNCS responds with a negative or positive response to the request and the VOD server implements the appropriate logic based on the response.

The SeaChange MediaCluster Server device manufactured by SeaChange International Corporation comprises a group of fault-resilient VOD servers connected over a network, in effect acting as one server. See, e.g., U.S. Pat. No. 5,862,312 to Mann, et al. issued Jan. 19, 1999 and entitled "Loosely coupled mass storage computer cluster" and its progeny. The SeaChange apparatus further includes a session resource manager (SRM), and associated connection manager (CM) and streaming service (SS). The CM ostensibly allocates bandwidth, selecting the best network delivery path over which to stream data to the requesting entity. The SS "optimizes" bandwidth and provides some level of fail-over behavior, such that software component failure will not necessarily cause loss or tear-down of the underlying sessions. No functionality relating to the selective conservation of bandwidth based on different service levels (e.g., SD or HD) is provided within this apparatus, however.

While useful for OD session allocation, the SRM function present in modern cable networks does not provide an adequate mechanism to selectively allocate bandwidth (or more importantly conserve bandwidth) for broadcasts based on their service level, e.g., SD or HD. Furthermore, no adequate mechanism for eliminating the redundancy within the aforementioned SD/SD simulcast paradigm is provided by the SRM, or for that matter any other prior art solution.

Various other schemes for resource and bandwidth management within a cable network are known. For example, U.S. Pat. No. 6,124,878 to Adams, et al. issued Sep. 26, 2000 entitled "Optimum bandwidth utilization in a shared cable system data channel" discloses a full service network (FSN) providing three communication channels that end between a headend and each set-top within the FSN. These channels comprise (1) forward-application-transport (FAT) channels that supply data from the headend to all or to only addressed ones of the set-tops, (2) a forward-data-channel (FDC) that supplies data from the headend to all or to only addressed set-tops, and (3) a reverse-data-channel (RDC) that supplies data from the set-tops to the headend. A fixed bandwidth FDC provides a first bandwidth portion for the high priority transmission of certain types of items at a continuous bitrate (CBR). All other items are transmitted over the FDC using at an available bitrate (ABR). A priority system for the selective transmission of these other items is based upon (1) how full a data buffer for an item is, as compared to a fullness reference, (2) how old the oldest data in the data buffer for the item is, as compared to an age reference. The fullness reference and the age reference are usually different for each of these other data items.

U.S. Pat. No. 6,169,728 to Perreault, et al. issued Jan. 2, 2001 and entitled "Apparatus and method for spectrum management in a multipoint communication system" discloses an apparatus and method for spectrum management in a cable system that controls upstream channel usage for secondary stations transmitting information to a primary station and downstream channel usage for secondary stations receiving information from a primary station. The apparatus and method controls channel load balancing, channel congestion, and channel assignment in the cable system, and controls upstream channels independently from downstream channels. Factors and parameters utilized in such channel control and allocation include error parameters, channel noise parameters, transmit and receive loading factors, and congestion parameters.

U.S. Pat. No. 6,211,901 to Imajima, et al. issued Apr. 3, 2001 and entitled "Video data distributing device by video on demand" discloses a mechanism that determines whether or not the broadcast of a requested video is to be provided in a FVOD (full video on demand) or an NVOD (near video on demand) service, and if there is any available channel (bandwidth) for the broadcast. If the broadcast has not been switched from the FVOD service to the NVOD service, then a busy state monitoring mechanism checks the number of the current simultaneous subscribers for the video. If the number is equal to or larger than a threshold, then the busy state monitoring mechanism instructs an NVOD service providing mechanism to broadcast the requested video in the NVOD service. If the number is smaller than the threshold, then the busy state monitoring mechanism instructs an FVOD service providing mechanism to broadcast the requested video in the FVOD service.

U.S. Pat. No. 7,207,055 to Hendricks, et al. issued Apr. 17, 2007 entitled "Bandwidth allocation for a television program delivery system" discloses a method of allocating bandwidth for a television program delivery system. This method selects specific programs from a plurality of programs, allocates the selected programs to a segment of bandwidth, and continues to allocate the programs until all the programs are allocated or all of the available bandwidth is allocated. The programs may be selected based on a variety of different factors or combination of factors. The selected programs may also be prioritized so that higher priority programs are distributed before lower priority programs in case there is not enough bandwidth to transmit all of the programs. This invention allows a television program delivery system to prioritize a number of television programs and distribute these programs based on their priority levels. The invention also permits a television program delivery system to dynamically allocate bandwidth over time or based on marketing information, such as consumer demand.

United States Patent Publication No. 20020095684 to St. John, et al. published Jul. 18, 2002 end entitled "Methods, systems and computer program products for bandwidth allocation based on throughput guarantees" discloses methods, systems and computer programs for controlling access to a shared communication medium such as a cable network utilizing a revolving priority queue. The revolving priority queue (RPQ) is divided into at least a low priority tier having a plurality of request queues and a high priority tier having a plurality of request queues. A request is directed into an initial queue in the high priority tier if throughput for an end user associated with the request fails to meet a guaranteed throughput. Furthermore, bandwidth may be allocated based on an order in which requests are read from the RPQ, where requests are read from the high priority tier before requests are read from the low priority tier of queues. Additional system embodiments are provided which may be used for requests or for packet-based bandwidth allocation.

United States Patent Publication No. 20040226044 to Goode published Nov. 11, 2004 entitled "Network bandwidth optimization by dynamic channel allocation" discloses a method for increasing channel utilization in a video broadcast system includes receiving, at a headend, a request for a video program from one of a plurality of subscriber stations. Determining whether the requested video program is associated with a first subset of channels representing broadcasted channels having a first subscriber viewership level greater than a threshold level, a second subset of channels representing broadcasted channels having a second subscriber viewership level less than the threshold level, and a third subset of channels representing on-demand channels having a third subscriber viewership. The first subset of broadcast channels is substantially continuously transmitted. The second subset of broadcast channels is transmitted based upon channel availability and programming assignments. The third subset of on-demand channels are transmitted from the headend to at least one of the plurality of subscriber stations upon assigning video programming corresponding to the requesting subscriber station.

United States Patent Publication No. 20060171390 to La Joie published Aug. 3, 2006 entitled "Method and apparatus for network bandwidth conservation" discloses methods and apparatus for conserving bandwidth within a network based on two or more different service levels. In an exemplary embodiment, programming that is simulcast on two or more program channels is mapped to one physical channel during periods when the programming is scheduled at only one service level (e.g., standard definition), thereby conserving bandwidth on the network that would otherwise be consumed by the simultaneous broadcast on the two or more channels. When the programming service level becomes heterogeneous across the channels (e.g., SD and HD simulcast), physical channel(s) supporting the HD content are provided within a local service area only "on-demand" using, for example, a switched digital channel allocation. Accordingly, no HD broadcast occurs within a given area until at least one user requests it, thereby further conserving network bandwidth.

Despite the foregoing, there is a need to manage the operation of such content-based networks (including for example BSA networks of the type previously described) in order to allow maximum subscriber satisfaction through maximizing opportunities for delivery of enhanced content (such as e.g., HDTV) and other desired formats given the installed infrastructure base. For example, in the context of a cable or satellite network, it would desirable to be able to optimize bandwidth consumption and allocation with respect to both Standard Definition (SD) and High Definition (HD) services so that the aforementioned goal of providing more opportunities for HD content delivery for subscribers, without having to add capacity or further "build out" the network infrastructure.

Moreover, in the context of BSA and other switched networks, it would be desirable to have a mechanism which accounts for the particular dynamics of these networks (including inter alia the aforementioned uncertainty as to whether a given program stream is really un-utilized at a given point in time) so as to enhance network operation, flexibility and capacity, as well as maximize user/subscriber satisfaction.

SUMMARY OF THE INVENTION

The present invention satisfies the foregoing needs by providing, inter alia, improved apparatus and methods for network optimization including content format selection and program allocation.

In a first aspect of the invention, a method of operating a content-based network is disclosed. In one embodiment, the network has a plurality of consumer premises equipment (CPE) associated therewith, and the method comprises: providing a plurality of programs for delivery over the network, at least a portion of the programs being provided in at least two formats; controllably switching at least some CPE of the network from a first one of the at least two formats to a second one of the at least two formats for a given program; and removing at least the first one of the formats from programming being delivered over the network. The controllable switching may be based on, e.g., one or more operational conditions within the network (such as available or projected bandwidth).

In one variant, the first one of the at least two formats comprises a lower quality version of the given program, and the second one of the formats comprises a higher quality version of the given program. For example, the lower quality version comprises a standard definition (SD) version, and the higher quality version comprises a high definition (HD) version.

In another variant, the network comprises a BSA network, and the act of removing comprises removing the first one of the formats from a given service group. Removal comprises switching off the first one of the formats for the given program for at least a portion of the service group.

In yet another variant, the method further comprises switching at least some of the users from a higher quality version of another programs to a lower quality version of the another program, and removing the higher quality version of the another programs from delivery over the network.

In another embodiment, the method comprises: providing a plurality of versions of at least one program stream, at least two of the plurality of different versions being substantially clamped to different bitrates; and selectively delivering at least one of the clamped at least two versions to a multiplexer for statistical multiplexing.

In one variant, the delivering comprises selecting the at least one clamped version based at least in part on available bandwidth within the network, and the available bandwidth within the network comprises a bandwidth projected for some time in the future. Available bandwidth within the network may comprise a bandwidth determined or projected using historical data as well.

In another variant, the available bandwidth is decreasing over time, and the delivering comprises selecting the at least one clamped version based on having a lower bitrate than another available version.

In yet another variant, the at least two of the plurality of versions comprises three versions each with progressively lower bitrates, and the selecting the at least one clamped version based at least in part on available bandwidth within the network comprises selecting the lowest bitrate version immediately after the highest bitrate version.

In still another variant, the available bandwidth is decreasing over time, and the delivering comprises selecting the at least one clamped version based on having a lower bitrate than another available version; and the method further comprises maintaining the lower bitrate version for a period of time after the bandwidth is increasing.

In another variant, the selectively delivering comprises selecting the at least one clamped version based at least in part on the content of the at least one program stream, and the selecting comprises selecting a higher bitrate version of the at least one program stream when the content comprises a program stream with high actual or projected viewership.

In yet a further variant, the selecting the at least one clamped version based at least in part on the content of the at least one program stream comprises selecting a higher bitrate version of the at least one program stream when the content comprises a program stream where at least one of picture or audio quality is considered critical.

In still a further variant, the network comprises a video-on-demand (VOD) capable network including version selection logic, and the plurality of different versions comprise a plurality of cached versions having different encoding bitrates. The selection logic selects at least one of the cached versions based at least in part on a selection criterion (e.g., at least one of: (i) available or projected network bandwidth, and (ii) the capabilities of the user device to which requested VOD content will be delivered).

In yet another embodiment, the method comprises: making available at least first and second versions of a program; identifying at least one bandwidth surplus on the network; determining a persistence associated with the at least one surplus; and based at least in part on the identifying and determining, selecting one of the first or second versions for delivery over the network.

In one variant, the first and second versions comprise a low bitrate version and a high bitrate version of the same program encoded according to the same encoding scheme, respectively. For example, the same encoding scheme can be selected from the group consisting of: (i) MPEG encoding schemes, and (ii) Windows Media Video schemes.

In another variant, the first and second versions comprise a standard definition (SD) version and a high definition (HD) version of the same program, respectively, and the identifying comprises identifying a surplus that is insufficient to accommodate the HD version without removal of at least one other program. The selection may comprise: selecting the HD version of the program; and consolidating a plurality of tuners of the network onto the HD version so as to permit removal of at least one SD version of the program from delivery.

In yet another variant, the identifying comprises identifying a bandwidth surplus that is sufficient to accommodate the higher-bandwidth version of the first and second versions; the determining a persistence comprises evaluating whether the persistence associated with the surplus is sufficient to accommodate substantially all of the higher-bandwidth version; and where the persistence is sufficient, selecting the higher-bandwidth version for delivery.

In still another variant, the identifying comprises identifying a future bandwidth surplus based at least in part on a predictive analysis. The determining may also be based at least in part on the predictive analysis (e.g., analysis of historical bandwidth consumption or allocation data).

In yet a further embodiment, the method comprises: delivering at least first and second versions of a program to a plurality of users; identifying at least one projected bandwidth surplus or deficiency on the network; and selectively switching ones of the plurality of users from the first version to the second version, or from the second version to the first version, based at least in part on the projected surplus or deficiency.

In one variant, the selectively switching comprises switching enough ones of the plurality of users to substantially consume the surplus, or substantially mitigate the deficiency, respectively.

In another variant, the identifying comprises: determining a projected available bandwidth some time in the future; determining a projected demand for the program; and determining the surplus or deficiency based at least on the projected available bandwidth and the projected demand. For example, at least one of the projected available bandwidth and the projected demand may be based on historical data for a network.

In still another variant, the first and second versions comprise a standard definition (SD) version and a high definition (HD) version of the same program, respectively, and the act of identifying comprises identifying a deficiency, and the selectively switching comprises consolidating a plurality of users of the network onto the HD version so as to permit removal of at least one SD version of the program from delivery.

In another variant, the selectively switching comprises: determining that at least some of the ones of the users comprise CPE capable of upconverting from SD to HD resolution; and selectively switching at least a portion of the users comprising up-conversion capability from the HD version to the SD version of the program. The up-conversion may comprise for example increasing the number of pixels in a video image by resampling; and sharpening the edges of objects within the image.

In a second aspect of the invention, a method of operating a content based network delivering programming rendered in both first and second formats is disclosed. In one embodiment, the method comprises: identifying a plurality of user devices associated with the network that are capable of utilizing the first type of format; and causing at least a portion of the devices to tune to a program rendered in the first format instead of the same program rendered in the second format.

In one variant, the method further comprises removing at least one instance of the program rendered in the second format from delivery over the network so as to reduce instances of duplicate programming delivery.

In another variant, the at least portion of devices are associated with a common portion or node of the network, and the act of causing comprises causing a plurality of user devices associated with that common portion or node to tune to the program rendered in the first format, thereby allowing removal of at least one instances of the program rendered in the second format from delivery to the common portion or node. The network might comprise for example a broadcast switched architecture network, the common node portion or node comprises a broadcast switched hub, and the removal comprises selectively switching the at least one instance from delivery using a switch disposed at the hub.

In yet another variant, the identifying is accomplished using data obtained from a client computer program operative to run on respective ones of the plurality of user devices. The indentifying may also comprise associating identifying information for individual ones of the devices with data stored at a substantially central storage location of the network. For example, the identifying information comprises information that allows the owner of or subscriber associated with a given one of the devices to remain anonymous (e.g., a one-way cryptographic hash).

In still another variant, the first format comprises a high definition (HD) format, and the second format comprises standard definition (SD) format. Alternatively, the first format might comprise a substantially non-lossy encoded format, and the second format a lossy encoded format.

In yet a further variant, the act of causing at least a portion of the devices to tune a program rendered in the first format instead of the same program rendered in the second format comprises causing the tuning to occur upon requests by users of the devices for the program rendered in the second format. In the case where the first format comprises a standard definition (SD) format, and the second format comprises a high definition (HD) format, the method also optionally further comprises conserving network bandwidth at least by reducing the number of instances of HD format programs.

In another variant, at least a portion of the plurality of devices comprise an up-conversion capability, thereby providing respective users of the up-conversion capable devices with programming at least approximating the quality provided by the HD format, even though their device has been switched to the programming rendered in the SD format.

In a third aspect of the invention, a method of utilizing bandwidth on a content-based network is disclosed. In one embodiment, the method comprises: evaluating the bandwidth available on the network; generating a version of a program delivered to at least one user device over the network, the generating based at least in part on the evaluating; and selectively substituting the generated version of the program for another version of the program that is delivered over the network.

In one variant, the generated version comprises a lower quality version of the program than the another version, and the selective substituting conserves bandwidth on the network relative to if the substituting was not performed. The generated version comprises for example a standard definition (SD) version, and the another version comprises a high definition (HD) version.

In another variant, the method further comprises: identifying a plurality of user devices associated with the network that are capable of utilizing the generated version; and causing at least a portion of the devices to tune the program rendered in the generated version, thereby reducing instances of duplicate programming delivery in the network.

In still another variant, the substituting comprises substituting the generated version within a given service group of the network. The network comprises for example a broadcast switched architecture (BSA) network, and the substituting comprises switching off the another version for at least a portion of the service group.

In yet a further variant, the evaluating indicates that available bandwidth on the network is decreasing over time; and the generating comprises generating a down-rated version of the program as compared to the another version.

Alternatively, the evaluating indicates that available bandwidth on the network is increasing over time; and the generating comprises generating an up-rated version of the program as compared to the another version.

In a fourth aspect of the invention, a method of operating a content based network to achieve a desired operational goal is disclosed. In one variant, the method comprises: delivering a first version of a program stream to at least one user of the network; providing a second version of the program stream, the second version being encoded differently than the first version; identifying at least one time where the second version can be substituted for the first version; and substituting the second version for the first version at least at the one time so as to achieve the goal.

In one variant, the operational goal comprises reduced bandwidth consumption, the first version comprises an encoding consuming a first bandwidth, and the second encoding comprises an encoding consuming a second bandwidth, the second bandwidth being less than the first bandwidth. For example, the first version comprises an MPEG-2 encoding, and the second version comprises an MPEG-4 or AVC encoding.

The at least one time when the second version can be substituted for the first may comprise for example at least one time when there is no demand for the first version.

In another variant, the operational goal comprises reduced duplication of programming, the first version comprises a standard definition (SD) program stream, and the second encoding comprises a high definition (HD) program stream, and the method further comprises tuning a plurality of other users of the network to the high definition program stream after the substitution. For example, the at least one time when the second version can be substituted for the first comprises at least one time when all users tuned to the SD program stream have HD-capable receivers.

In still another variant, the second version comprises a program stream encoded at a different bitrate than the first version, e.g., at a bitrate selected based at least in part on the display resolution capabilities of at least one user of the network.

In a fifth aspect of the invention, apparatus for use in a content based network is disclosed. In one embodiment, the apparatus delivers programming rendered in both first and second formats, and comprises: a processor; an interface in data communication with the processor, the interface adapted to communicate with a storage device; a network interface; and at least one computer program adapted to run on the processor. In one variant, the at least one program being configured to: identify, by accessing data on the storage device, a plurality of user devices coupled to the network that are capable of utilizing the first type of format; and communicate via the network interface to cause at least a portion of the user devices to tune to a program rendered in the first format instead of the same program rendered in the second format.

In another variant, the apparatus is further adapted to cause removal of at least one instance of the program rendered in the second format from delivery over the network so as to reduce instances of duplicate programming delivery, and comprises e.g., a control apparatus used in a broadcast switched architecture switching hub. The removal comprises e.g., selectively switching the at least one instance from delivery using a switch disposed at the broadcast switched hub of the network.

In yet another variant, the at least portion of devices are associated with a common portion or node of the network, and the at least one program is configured to send a message or signal to a plurality of user devices associated with that common portion or node causing them to tune to the program rendered in the first format, thereby allowing removal of at least one instances of the program rendered in the second format from delivery to the common portion or node.

In other variants, the identifying is accomplished using data obtained from a client computer program operative to run on respective ones of the plurality of user devices. Data on the storage device comprises e.g., data that associates identifying information for individual ones of the devices with configuration data for those devices. Such identifying information comprises information that allows the owner of or subscriber associated with a given one of the devices to remain anonymous in one variant.

In still a further variant, the causing at least a portion of the devices to tune a program rendered in the first format instead of the same program rendered in the second format comprises causing the tuning to occur upon requests by users of the devices for the program rendered in the second format.

In another variant, the first format comprises a standard definition (SD) format, and the second format comprises a high definition (HD) format, and the method further comprises conserving network bandwidth at least by reducing the number of instances of HD format programs.

In yet a further variant, at least a portion of the plurality of devices comprise an up-conversion capability, thereby providing respective users of the up-conversion capable devices with programming at least approximating the quality provided by the HD format, even though their device has been switched to the programming rendered in the SD format.

In a sixth aspect of the invention, user premises apparatus adapted for variable bitrate operation within a content-based network is disclosed. In one embodiment, the apparatus comprises: a network interface adapted to at least receive program streams from the network; a processor in data communication with the network interface; a storage device in data communication with the processor; and at least one computer program operative to run on the apparatus. In one variant, the apparatus is further adapted to: receive at least one of the program streams via the interface at a bitrate different than the bitrate associated with real-time display of the at least one stream; store the at least one received program stream as program data using the storage device; and play back the stored data at the real-time display rate.

In one variant, the at least one computer program is adapted to communicate with a network process to select at least the receive bitrate.

In another variant, the receive bitrate is less than the real-time display bitrate.

In yet another variant, the receive bitrate is greater than the real-time display bitrate, and the apparatus is configured to download the program stream in one or more bursts such as e.g., via a session-based infrastructure of the network (such as a video-on-demand (VOD) infrastructure).

In still another variant, the apparatus is adapted to download secondary content at least in-between the bursts opportunistically.

In yet a further variant, the apparatus is adapted to download the program stream using at least the Session Initiation Protocol (SIP).

In another variant, the apparatus further comprises software adapted to trans-rate the stored program data to a bitrate different than the receive bitrate to produce trans-rated data. For example, the trans-rated data is transmittable by the interface to another apparatus via a second interface.

In a seventh aspect of the invention, a storage device comprising a computer-readable medium having a computer program stored thereon is disclosed. In one embodiment, the program comprises a program adapted to be run on a computerized device and implement a network supervisory process for program format analysis and allocation. In one variant, the program comprises a distributed application (DA) having network (e.g., server) and client portions, the client portions being in communication with the network portion and adapted to be run on consumer premises equipment (CPE) within the network for, e.g., gathering capabilities information, historical data, and/or logged errors.

In an eighth aspect of the invention, a system for providing enhanced network operation is disclosed. In one embodiment, the network comprises a broadcast switched architecture (BSA) network, and the system comprises a software process adapted to control the selection of various formats of encoded content so as to implement MSO network policies while minimizing the number of separate program streams actually delivered.

In a ninth aspect of the invention, a software architecture for providing enhanced network operation is disclosed. In one embodiment, the network comprises a broadcast switched architecture (BSA) network, and the software architecture comprises a supervisory process disposed at the headend of the network, the supervisory process being adapted to implement the foregoing methods. In another embodiment, the software architecture comprises a plurality of network portions (e.g., disposed at the headend and a switching hub). In yet another embodiment, client portions disposed on CPE within the network are used to communicate with, and implement policies for, the network portion(s).

In a tenth aspect of the invention, methods of doing business based on, inter alia, enhanced network bandwidth utilization and format selection are disclosed.

In an eleventh aspect of the invention, a server apparatus is disclosed. In one embodiment, the server apparatus comprises a server apparatus operating within a content delivery network and configured to deliver a plurality of content programs to a plurality of consumer premises equipment (CPE) in communication therewith, said plurality of CPE being part of a service group.

In one variant the apparatus comprises a storage entity configured to store the plurality of content programs, at least one interface configured to provide the plurality of content programs for delivery to the plurality of CPE, and a processor configured to run at least one computer program thereon, the computer program configured to: receive information identifying display capabilities of individual ones of the plurality of CPE in the service group, and cause switching the individual ones of the plurality of CPE from receiving a first format of a particular program to receiving a second format thereof based at least in part on the information, the first format being encoded differently than the second format.

In a twelfth aspect of the invention, a method for achieving increasing available bandwidth within a content delivery network is disclosed. In one embodiment, the method comprises: delivering a first encoded version of a program to a first plurality of user devices within a service group of the network, the first encoded version comprising an encoding consuming a first bandwidth, delivering a second encoded version of the program to a second plurality of user device of the service group, the second encoded version comprising an encoding consuming a second bandwidth, determining one or more decoding capabilities of the first plurality of user devices, identifying, based at least in part on the determining, at least one time where the first encoded version can be replaced with the second encoded version for at least the first plurality of user devices, replacing the first encoded version with the second encoded version at least at the one time for at least the first plurality of devices, and removing the first encoded version from delivery to the service group, the removing increasing the available bandwidth on the network.

DETAILED DESCRIPTION OF THE INVENTION

Figure 1:
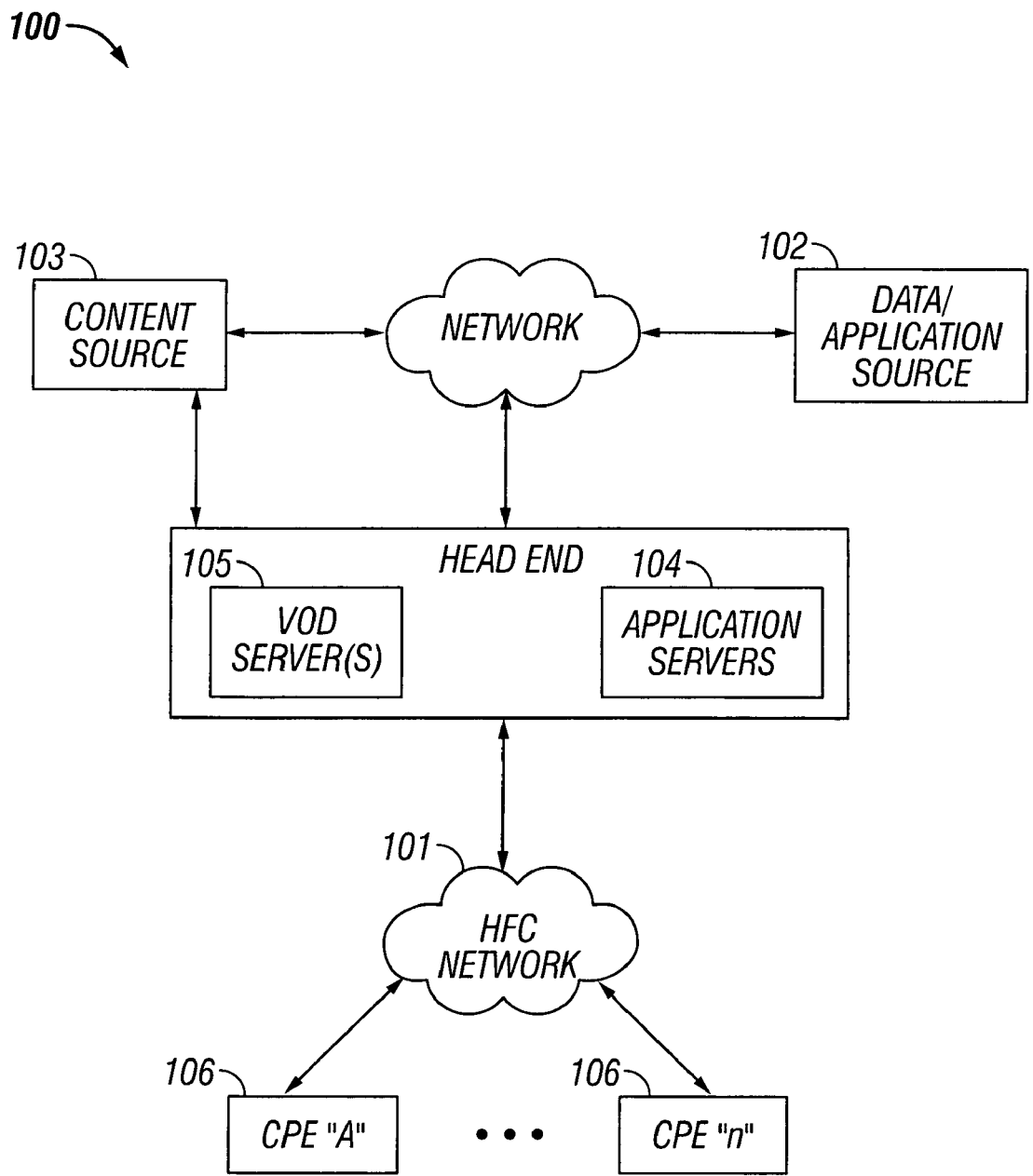
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), cellular telephones, and minicomputers, whether desktop, laptop, or otherwise, and mobile devices such as handheld computers, PDAs, personal media devices (PMDs), and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "conditional access" refers to any access control scheme, whether implemented in hardware, software, or firmware (or combinations thereof), including without limitation members of the "PowerKey™" family, NDS (including VideoGuard, mVideoGuard, etc.), DVB, and Motorola/General Instrument DigiCipher® family (DigiCipher II, etc.). These can be implemented using, for example, CA-specific hardware/software elements embedded in the device, the so-called "CableCARD™" plug-in security module access technology, a downloadable CA system (DCAS), or otherwise.

The terms "Customer/Consumer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer/consumer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "server" refers to any computerized component, system or entity regardless of form that is adapted to provide data, files, applications, content, or other services to one or more other devices or entities on a computer network.

As used herein, the term "service group" refers to either a group of service users (e.g. subscribers) or the resources shared by them that may be physically and/or logically related.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "trickle download" refers to without limitation any delivery or download mode which is at a rate appreciably less than the maximum capability of the extant network over which the downloaded content is being delivered. For example, one type of trickle download might comprise a slow, substantially constant rate download "in the background" using small amounts of excess primary bandwidth capability. Trickle downloads may programmatic (e.g., predetermined to continue in one session until complete, such as based on a bandwidth reservation), or may also be opportunistic; e.g., conducted in two or more segments as excess capacity becomes available.

As used herein, the terms "user channel" and "program channel" are all generally synonymous with the concept of a perceived stream of information. For example, a program/user channel might comprise "Channel 3" which carries the content of a given network (e.g., NBC). This is to be distinguished from a physical channel, which is used to physically carry and distribute the content, which may for example comprise one or more QAMs within a given portion of the RF spectrum of a cable system.

As used herein, the term "user interface" refers to, without limitation, any visual, graphical, tactile, audible, sensory, or other means of providing information to and/or receiving information from a user or other entity.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

The present invention discloses, inter alia, methods and apparatus for optimizing network bandwidth utilization by delivering to users only the minimum number of programs required by service provider policies. These methods and apparatus are useful in, e.g., cable television, satellite, and other content-based networks so as to minimize bandwidth consumption while also maximizing subscriber satisfaction and service level (e.g., video and/or audio quality).

The disclosed methods and apparatus are especially useful when programming consumption changes drastically. For example, so-called "primetime" viewing typically comprises the maximum number of individual programs being delivered, as well as the maximum diversity of programs; the primetime demand for programming typically differs dramatically from the demand during early morning viewing, and also from that of other relatively high consumption periods.

The methods and apparatus disclosed herein are also particularly useful on those occasions where programming bandwidth (as contrasted from consumption) varies dramatically, for instance, between delivery of standard definition and high definition programming.

In one exemplary embodiment, a "forced delivery" approach is employed, wherein a copy of a program of a certain type is selected and delivered via one or more program channels. For example, a given program may be available in both a standard definition (SD) format and high definition (HD) format. Furthermore, different versions, such as MPEG2 and MPEG4 audio video control of SD and/or HD formats of programs may be available. If it is known that a group of user CPE in the service area are HD-capable, then the service may force the CPE of those users to tune to any available HD versions of programs to reduce the instances of duplicate programming, by satisfying SD programming requests using HD programming. Conversely, in times of constrained bandwidth, the SD version of a program may be delivered when an HD program is requested. If the user's CPE has up-conversion capability, the user may still advantageously experience "HD-quality" video, even though the CPE input has been switched to SD.

As other alternatives, a technique know as "re-binding", or alternatively a payload substitution, may be used in place of a forced re-tuning consistent with the invention.

In other embodiments, up-rating or down-rating of one or more program streams (i.e., changing the bitrate up or down) can be used to temporarily or even indefinitely accommodate periods of increased or reduced network capacity, respectively. This "trans-rating" may be accomplished dynamically and according to any number of different implementation schemes. For example, in one variant of the invention, the system cannot only down-rate and up-rate content bitrates, but also has knowledge of when to perform such rate changes (such as based on e.g., a priori knowledge of content bitrate profiles via metadata or the like, or predictive analysis of historical tuning and/or bandwidth consumption data). Moreover, the system can intelligently select content encoding or resolution formats to switch to when bitrate or other changes are needed. These rate and/or format changes can be inserted dynamically; i.e., during subscriber viewing.

The methods and apparatus disclosed herein may be applied to any number of different network content delivery paradigms including without limitation: (i) traditional broadcast networks, (ii) Broadcast Switched Architecture (BSA) networks, and (iii) video-on-demand (VOD) networks.

Detailed Description of Exemplary Embodiments

Exemplary embodiments of the apparatus and methods of the present invention are now described in detail. While these exemplary embodiments are described in the context of the aforementioned hybrid fiber coax (HFC) cable architecture having an multiple systems operator (MSO), digital networking capability, and plurality of client devices/CPE, the general principles and advantages of the invention may be extended to other types of networks and architectures where bandwidth conservation is required or desirable, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system or over satellite or millimeter wave-based network having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

It is also noted that while the following discussion is cast primarily in terms of two service levels (i.e., SD and HD), the methods and apparatus disclosed herein can be extended to other numbers and types of service levels. For example, it is foreseeable that yet even higher levels of definition may be employed in the future (e.g., "ultra-high definition" or UHD), thereby allowing intelligent bandwidth conservation between three service levels (SD, HD, and UHD). As another option, multiple levels or rates may be present with one of the aforementioned service levels, such as where the SD level includes levels SD1, SD2, . . . SDn, and/or the HD level similarly includes HD1, HD2, . . . HDn, with each of these sub-levels having different data rates and/or other characteristics. Alternatively, bandwidth conservation according to the present invention may be performed not based on definition level (data rate), but some other attribute such as for example the selective availability of a type of service (e.g., OD, IPTV, or DVR/PVR). Various alternate conservation schemes are described subsequently herein in greater detail.

It is further noted that while described primarily in the context of 6 MHz RF channels, the present invention is applicable to literally any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Additionally, the invention is in no way limited to any particular modulation type or medium access scheme, and can be implemented using for example using QAM, orthogonal frequency division multiplexing (OFDM), sigma-delta modulation (SDM), time-division multiplexing (TDM), etc.

Network—

FIG. 1 illustrates a typical content-based network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Figure 1A:
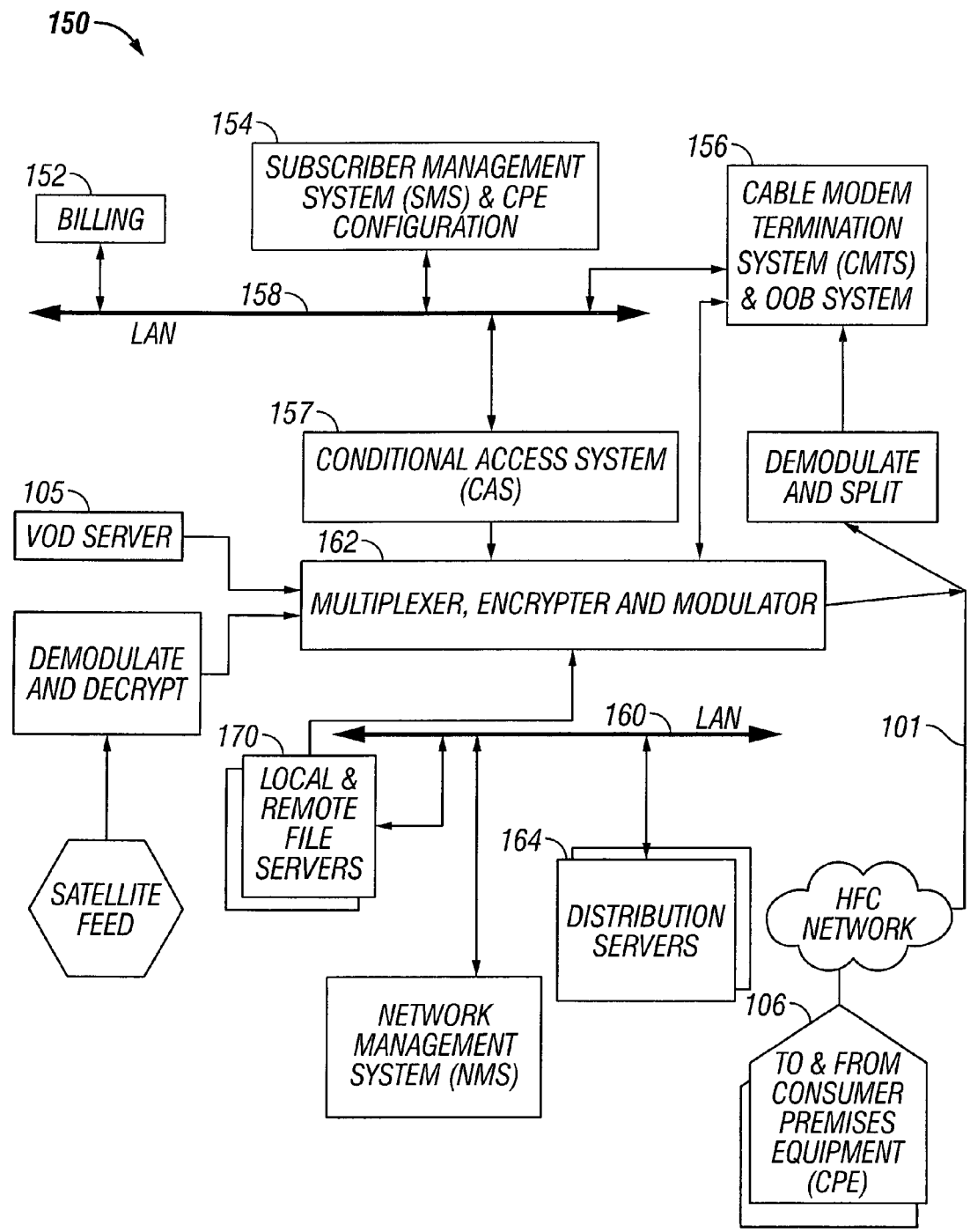
FIG. 1a is a functional block diagram illustrating one exemplary HFC cable network headend configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

Figure 1B:
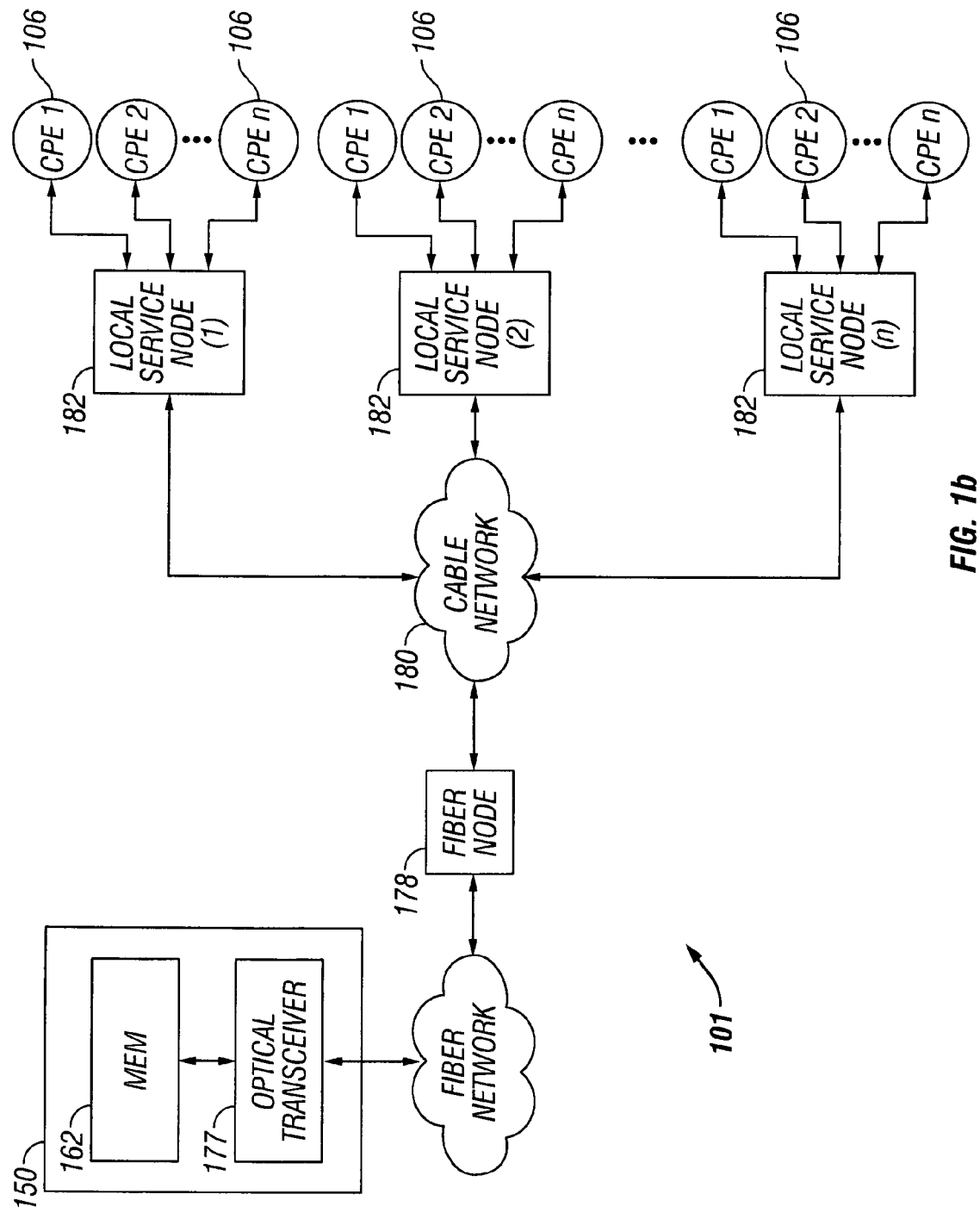
FIG. 1b is a functional block diagram illustrating one exemplary local service node configuration useful with the present invention.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend and sent to neighborhood hubs (see FIG. 1b) via a variety of interposed network components.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks—

Figure 1C:
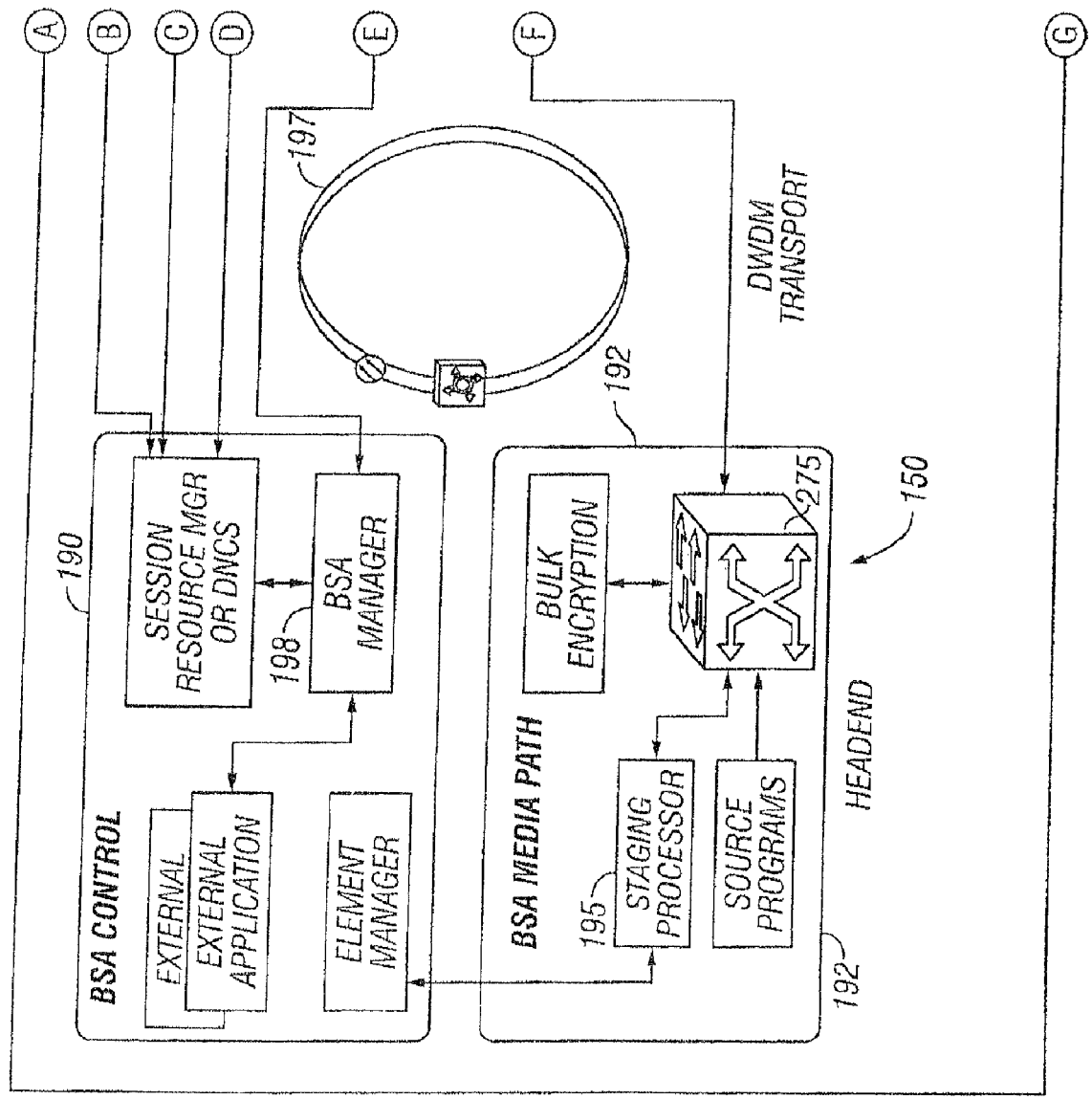
FIG. 1c is a functional block diagram illustrating one exemplary broadcast switched architecture (BSA) network useful with the present invention.
Figure 1C:
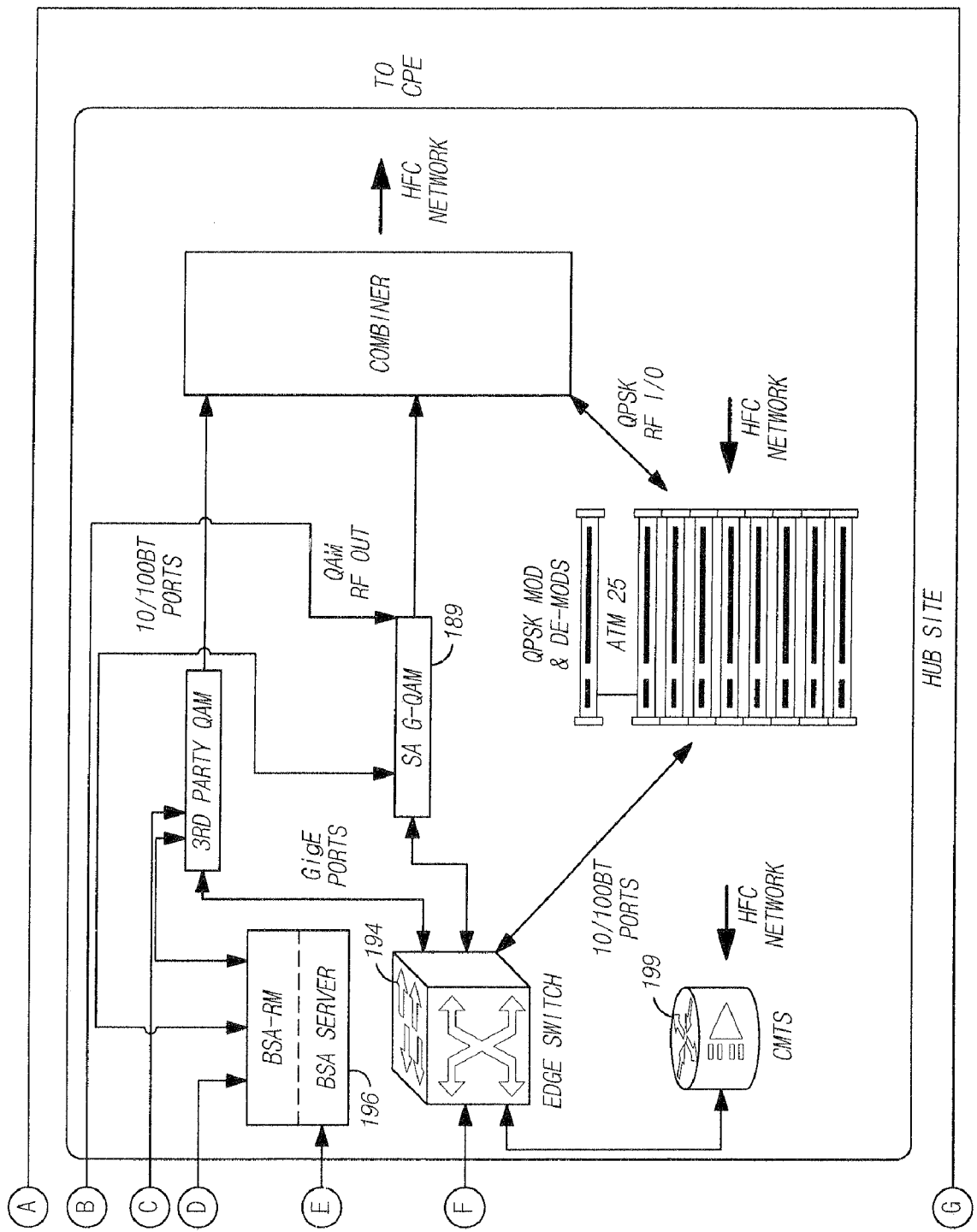

FIG. 1c illustrates an exemplary "switched" network architecture also useful with the content format selection and allocation features of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "TECHNIQUE FOR EFFECTIVELY PROVIDING PROGRAM MATERIAL IN A CABLE TELEVISION SYSTEM", incorporated herein by reference in its entirety, describes one exemplary broadcast switched digital architecture useful with the present invention, although it will be recognized by those of ordinary skill that other approaches and architectures may be substituted.

In order for the BSA function to be transparent to the subscriber, channel change latencies are kept to a minimum (e.g., 250 ms or less as compared to average linear digital broadcast services). Like video-on-demand (VOD) systems, BSA programs are streamed to a service group (contrast: switch) only when being viewed. Unlike VOD, many viewers can view the same stream. Typically, only real-time linear programs are included in BSA broadcasts. Since there is no storage involved, the "VCR" controls (e.g., trick mode functions) common to VOD are not available. In this regard, BSA is much simpler that VOD. Commercials or other programming segments cannot be skipped, and program bitrates can be treated as in more conventional systems.

In the context of the aforementioned BSA network, there are several metrics or indices which are useful in evaluating the performance of the network. Specifically, the expression "peak streams" represents the maximum number of different program streams that are instantaneously (based on specified data intervals) needed. Using software, peak stream requirements can be analyzed for each group size. It has been noted by the Assignee hereof that generally speaking, as service group size is decreased, peak stream needs also decrease. When viewed over a sufficiently short time scale (e.g., two hour periods), it is possible to compare the moment-to-moment variability in peak stream use. Note that the physical network topology (which determines service group size) can also be modified, and is expected to migrate towards smaller groups of subscribers over time.

It has also been noted that the smaller service groups display roughly the same variability as the larger service groups down to a certain threshold size. When considered as a percentage of maximum stream use, as service group size decreases beyond this threshold, variability increases, and will impose a limit the amount of concentration that can be safely implemented within the system. Concentration in the context of BSA networks is defined as a ratio of the total bandwidth of the programs offered, to the BSA bandwidth provided to the service group. While this is conveniently expressed as a ratio of stream counts, in practice streams will be of various bitrates; concentration is therefore best thought of as the ratio of the bitrates. Concentration generally (at a given grade of service or blocking frequency) trends upwards with decreasing service group size.

Another useful metric of the value of BSA is yield. Yield is a function of concentration and the total number of programs included. Yield is important to consider when comparing the value of various bandwidth reclamation techniques.

As verified by actual trials conducted by the Assignee hereof, BSA provides significant concentration, which results in the ability to vacate significant portions of the previously occupied bandwidth ("free" bandwidth yield).

Also of interest is the metric of "redundant viewership". Redundant viewers are those which view otherwise unique programs. Generally speaking, the highest number of redundant viewers occurs at prime-time or just post prime time. This is also the time of greatest total viewership and the time of highest peak stream needs. A design point of X streams would provide a non-blocking grade of service; however, however, significant surplus bandwidth still exists below the X-stream level. Unfortunately, the greatest surpluses occur at times when other services (e.g., VoD) also have their lowest demands. Edge QAM resource sharing with VoD is therefore not expected to provide significant interleaving bandwidth gains. However, the BSA system can be advantageously operated to allow this surplus bandwidth to be utilized in other ways, such as for transport of data, video, voice, or even future applications which would require additional bandwidth.

Gain is a useful parameter for comparison of BSA with statistical multiplexing technology. In BSA, percent gain is defined as:

$$(\text{Concentration}-1) \times 100 \qquad \text{Eqn. (1)}$$

In this context, content that occupies the "freed up" spectrum is assumed to operate with the same level of efficiency as the content being processed (i.e. switched under the BSA architecture, or alternatively statistically multiplexed).

A primary advantage of the BSA paradigm is bandwidth conservation/preservation. Bandwidth for unviewed programs is not consumed, and can be re-allocated. Similarly, new programs can be added without adding bandwidth. Advantageously, programs with narrow appeal can be added in a BSA system with little if any bandwidth impact. More popular programs will impact the BSA bandwidth, but to a lesser extent than was traditionally the case. Multiple bitrates can also be made available for use or sale to programmers or advertisers.

BSA bandwidth efficiencies are at least in part a result of over-subscription. Specifically, the selection of programming is greater than the bandwidth allocated to the service group. This can result in blocking, the case where a viewer is denied access to a requested program. However, the aforementioned trials conducted by the Assignee hereof demonstrate that when properly configured, blocking events are sufficiently rare, so as to be less common than a network outage, thereby providing a sufficient level of service.

Additionally, a BSA system typically gathers and keep logs or other records of programmer-specific viewership data. For example, the BSA server gathers logs that are based on the client-server interactions. These logs or records are maintained to allow for well-considered "recapture" of non-viewed program streams (i.e., reclamation of bandwidth). The server manages bandwidth by removing streams based on this activity data. In typical practice, unviewed streams will be marked, but not actually removed until the bandwidth is needed either because of a client request, or based on external resource demands such as VOD overflow.

In one exemplary embodiment, the network session manager (BSA manager) logs all channel change events and is aware of the tuning locations of all tuners, not just those that happen to be viewing BSA programs. This provides highly accurate and complete viewership data based on actual channel changes as contrasted with extrapolations or other estimation techniques.

In the exemplary embodiment of the present invention, the edge switch 194 (generally located in the distribution hub as shown in FIG. 1c) is flooded with all available programs. This improves transport efficiency, because a simple unidirectional "drop and continue" protocol is performed at each hub location on a given optical transport ring 197. The concept of flooding also simplifies the transport network in that no control system is needed; rather a simple "deliver everything" paradigm is used. This approach also advantageously makes this portion of the signal chain more robust, since more complex control systems generally lend themselves to a higher operational failure rate.

Because ordinary broadcast programming is supplied using BSA, the transport network 197 needs to have a high degree of availability. In the exemplary embodiment, BSA program transport is supplied through a redundant, spatially diverse counter-rotating Ethernet ring topology, although other topologies may be utilized with success.

In addition to "broadcast" content (e.g., video programming), the systems of FIGS. 1a and 1c also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets received from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Methods—

Figure 2:
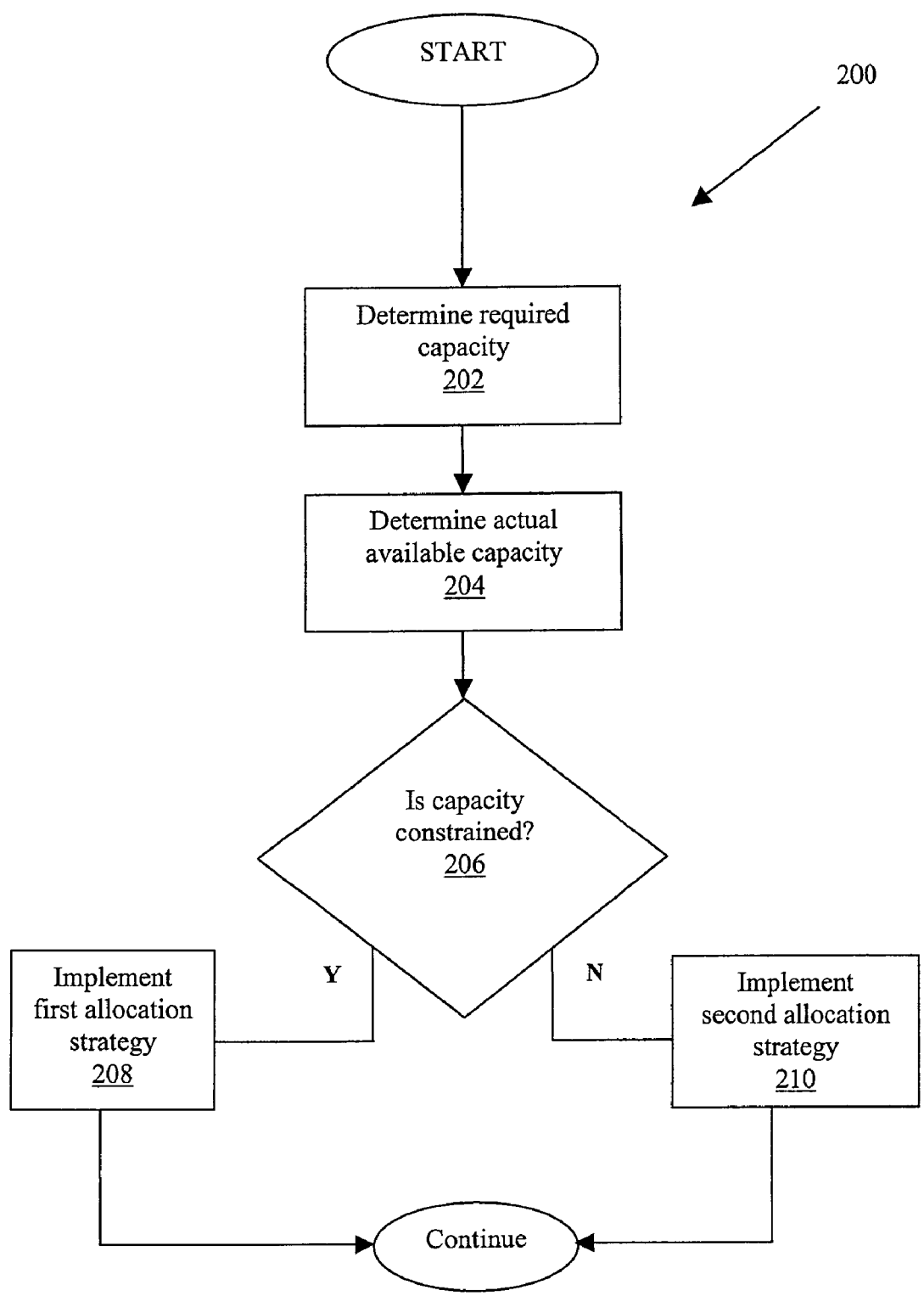
FIG. 2 is a logical flow diagram illustrating one exemplary embodiment of the generalized method of program allocation according to the invention.

Referring to FIG. 2, one embodiment of the generalized method of selecting and allocating programming according to the present invention is described.

Figure 4A:
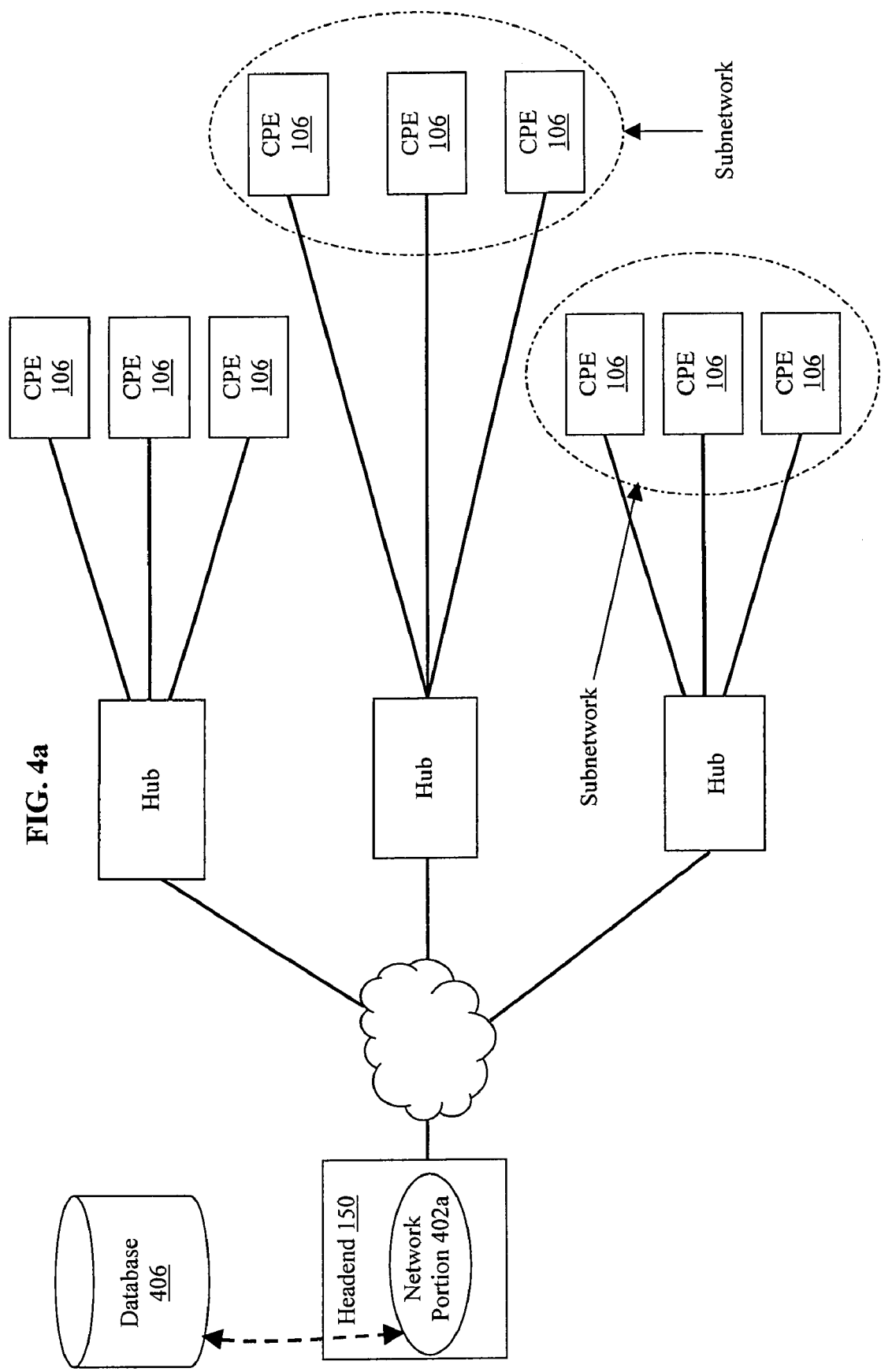
FIG. 4a is a block diagram illustrating a first exemplary embodiment of a network software architecture according to the present invention.
Figure 4B:
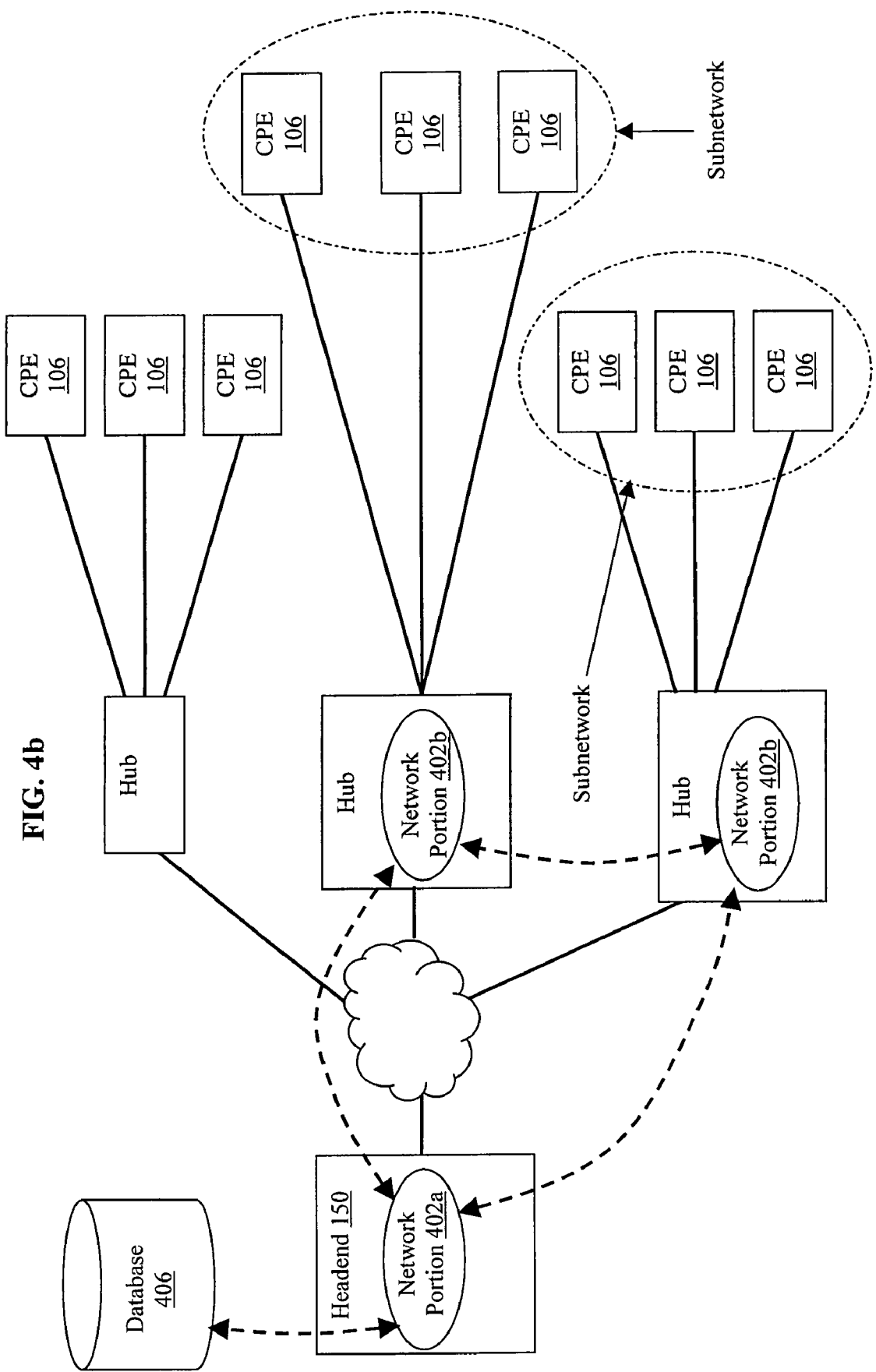
FIG. 4b is a block diagram illustrating a second exemplary embodiment of a network software architecture according to the present invention.
Figure 4C:
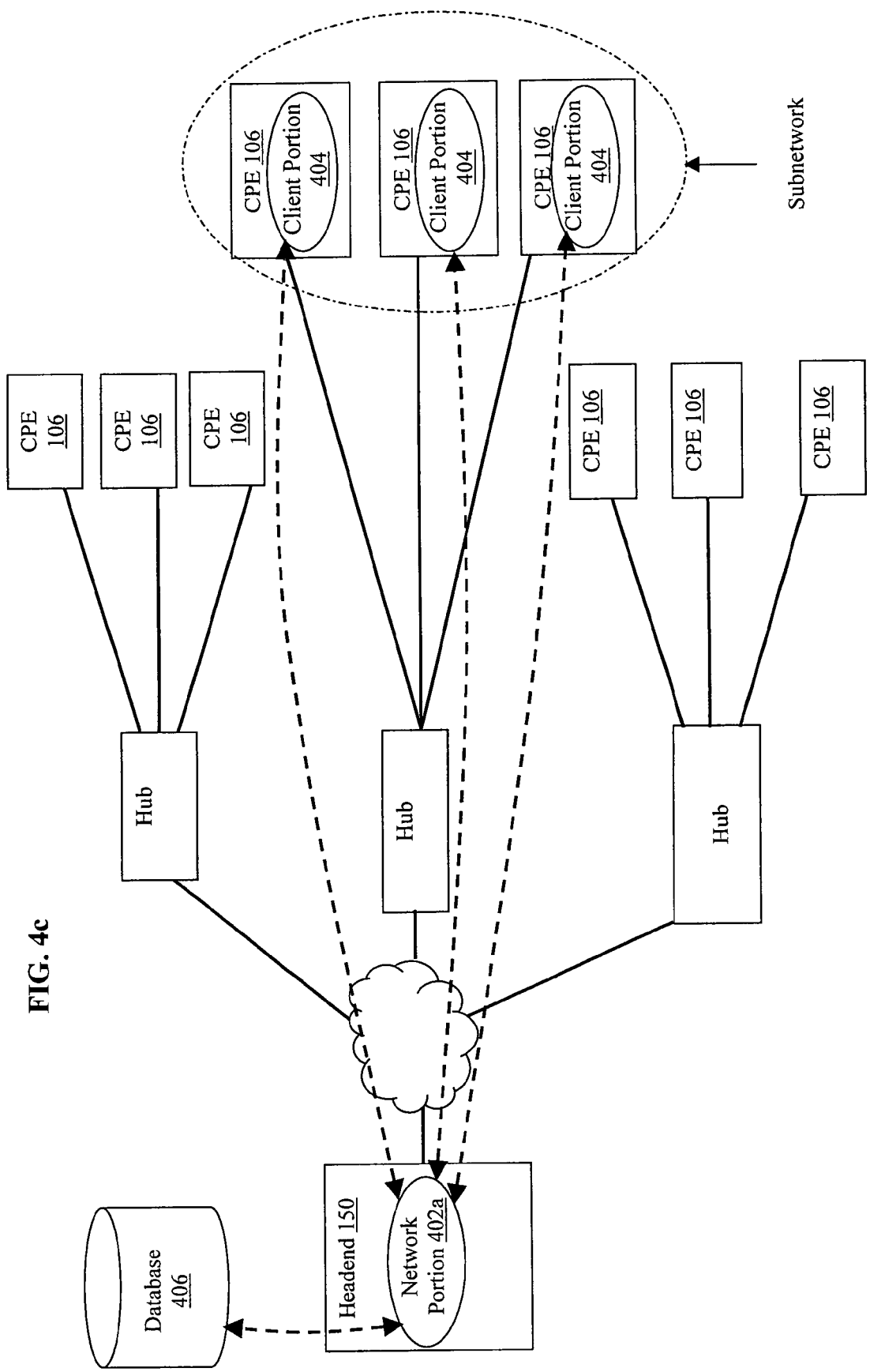
FIG. 4c is a block diagram illustrating a third exemplary embodiment of a network software architecture according to the present invention.

It will be appreciated that while portions of the following description are cast in terms of an exemplary "supervisory process" (e.g., a server-based or other computer program or collection of programs that is adapted to implement the various methodologies of the invention within a content-based network; see FIGS. 4a-4c and related discussion), the invention is in no way so limited, and in fact may be practiced using other approaches including without limitation by manual intervention or operation by a human, or via a dedicated or application specific integrated circuit (ASIC), firmware, or even at least partly in hardware. Moreover, the supervisory process described herein may be integrated into other extant platforms or devices within the host network, such as for example cable headend computer systems, BSA switching hub computers, and so forth, as will be recognized by those of ordinary skill.

As shown in FIG. 2, the method 200 generally comprises first determining a required bandwidth necessary to service existing or planned program requests within the network (step 202). Instantaneous bandwidth sources and metrics of the type well known in the art can be used to provide current bandwidth requirements. Alternatively (or additionally), future projections for instantaneous or other bandwidth requirements can be generated, such as those based on historical or anecdotal data. See, e.g., co-owned and co-pending U.S. patent application Ser. No. 11/800,093 entitled "METHODS AND APPARATUS FOR PREDICTIVE CAPACITY ALLOCATION" filed May 3, 2007, which is incorporated herein by reference in its entirety, for exemplary mechanisms and methods by which such historically— or anecdotally-based predictions may be provided.

Next, per step 204, the actual or available bandwidth for the network (or relevant portions thereof) is determined. For example, if the service group comprises 7 QAM carriers each capable of carrying a total of 38.8 Mb/s, then the total potentially available bandwidth is 271.6 Mb/s. However, note that the preceding example is intentionally simplified insofar as for purposes of allocating programs to QAM carriers, entire programs must be allocated to a given carrier. Depending on the bitrate requirements of individual programs, it may not be possible to fully pack one or more QAM carriers with program data up to their individual 38.8 Mb/s limits. Therefore, the "total available bandwidth" in the example is not necessarily 271.6 Mb/s, but may be 271.6 Mb/s less an amount that represents the sum of all the "left over" or wasted bandwidth of the QAM carriers that cannot be allocated because they are each too small to accommodate an entire program.

Depending on whether bandwidth is constrained (per the evaluation of step 206), a first or second (or third, etc.) program selection/allocation strategy is implemented per steps 208 and 210 respectively. As described in greater detail subsequently herein, these selection and allocation strategies may take several forms, depending on the particular attributes and constraints of the network at that time, and generally include: (i) substituting a lower-quality or bitrate version of a given program for a higher-quality/bitrate version, or vice versa; and (ii) consolidating viewers onto certain channels based on their CPE capabilities and removing unused (or under-used) channels so as to minimize the number of program streams delivered.

For example, factors including (without limitation): (i) availability and use of CPE that can utilize certain encoding formats (e.g., HD-capable devices), (ii) availability and use of up-conversion-capable devices, (iii) type of requested programming, and (iv) the projected duration or persistence of a bandwidth surplus or deficiency, may all be utilized to determine an allocation strategy.

Figure 2A:
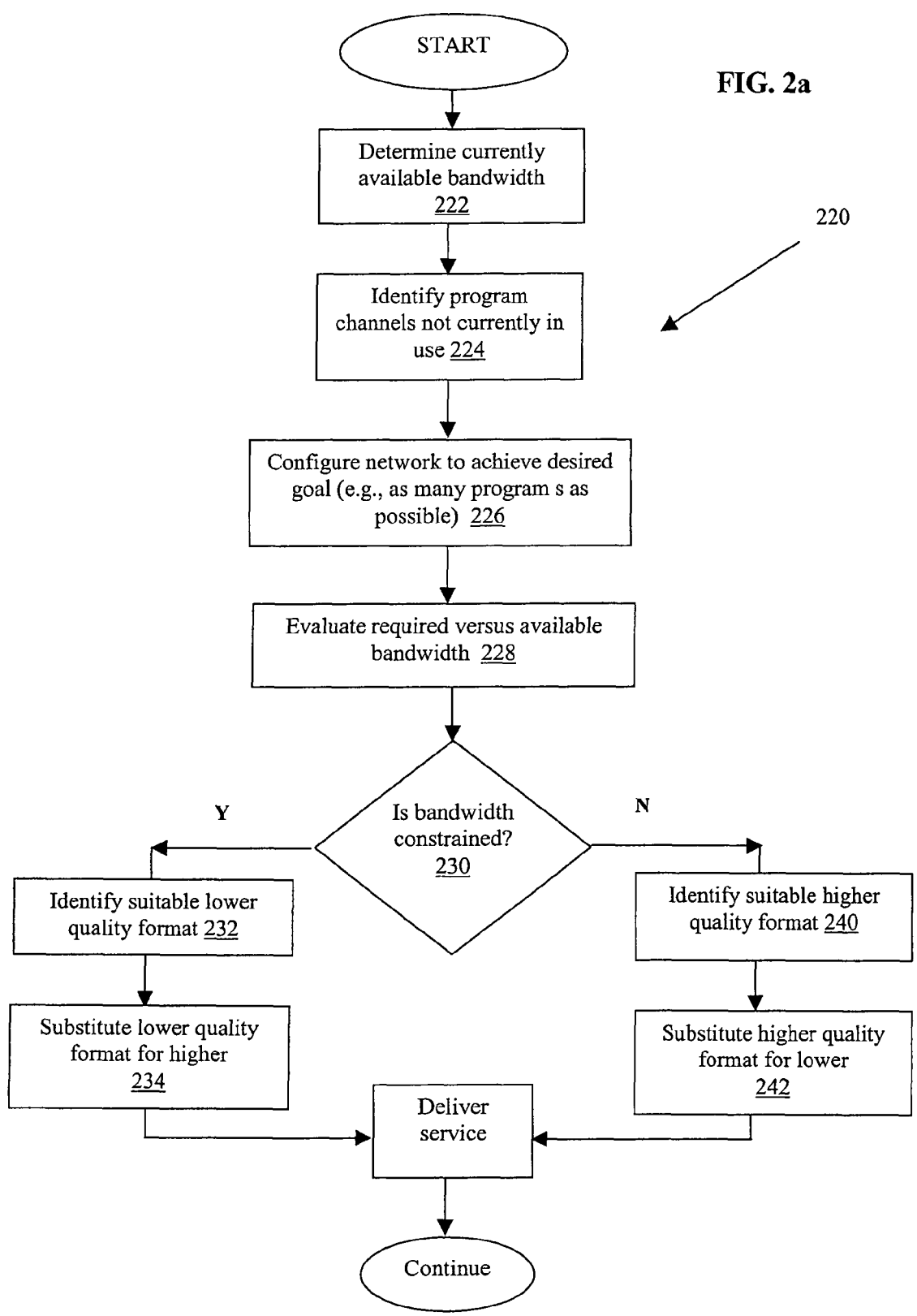
FIG. 2a is a logical flow diagram illustrating one exemplary implementation of the method of program allocation of FIG. 2.

Referring to FIG. 2a, one exemplary embodiment of the method 220 of selecting and allocating programming according to the present invention is described. In the illustrated embodiment, the currently available bandwidth is first determined per step 222. For example, one embodiment of the invention utilizes the methods and apparatus described in co-assigned application Ser. No. 11/243,720, entitled "SELF-MONITORING AND OPTIMIZING NETWORK APPARATUS AND METHODS" and incorporated by reference herein in its entirety. The method 220 may also optionally attempt to (i) predict future unused bandwidth, for example, using the methods described in co-assigned application Ser.

No. 11/800,093 entitled "METHODS AND APPARATUS FOR PREDICTIVE CAPACITY ALLOCATION" previously incorporated herein, and/or (ii) predict which programs will be viewed at a given time, using for example the methods described in application Ser. No. 11/243,720, entitled "Self-monitoring and Optimizing Network Apparatus and Methods". Using these techniques advantageously allows the MSO to predict bandwidth availability, and at least to some degree the program demand profile, at a given time in the future.

Program channels not currently in use may also be determined per step 224 using, for example, the methods described in co-assigned application U.S. patent application Ser. No. 09/956,688 entitled "TECHNIQUE FOR EFFECTIVELY PROVIDING PROGRAM MATERIAL IN A CABLE TELEVISION SYSTEM", and/or U.S. patent application Ser. No. 11/243,720, entitled "SELF-MONITORING AND OPTIMIZING NETWORK APPARATUS AND METHODS", each previously incorporated by reference herein in its entirety. For example, a channel changing log or other such mechanism that tracks channel changes, as well as a statistically-based or extrapolation approach, may be used consistent with the present invention.

Per step 226, the network is configured to deliver as many programs as possible (or achieve another desired operational goal) based upon e.g., the determination of program channels expected to be in demand at any given time of day, and the currently available bandwidth. For example, a table of program channels may be determined dynamically or predictively as described in co-assigned application Ser. No. 11/800,093 entitled "METHODS AND APPARATUS FOR PREDICTIVE CAPACITY ALLOCATION", or co-assigned application Ser. No. 11/243,720, entitled "SELF-MONITORING AND OPTIMIZING NETWORK APPARATUS AND METHODS", both of which are incorporated by reference herein in their entirety.

Next, per steps 228 and 230, the bandwidth requirements of the requested or predicted programs are evaluated and compared to determine if it exceeds, or is predicted to exceed, the capacity of the current (or predicted) available bandwidth, or vice versa. Note that this can be accomplished for example on an instantaneous basis (i.e., is there any case where instantaneous bandwidth exceeds capacity, whether now or during any future prediction window), or alternatively on a statistical basis (e.g., identify cases where demand exceeds capacity are 3s {3 standard deviations} or more, so as to identify only events that occur at or above some statistical level of significance). Myriad other approaches to comparing two quantities as a function of time according to a prescribed acceptance criterion will also be recognized by those of ordinary skill given the present disclosure.

In the event that the available bandwidth capacity exceeds the sum of the bandwidth requirements of the requested programs (using whatever criterion is selected), the responsible supervisory process may cause the replacement of lower quality versions of programs with higher quality versions of the same programs per steps 232 and 234. The decision to replace lower quality programs with higher quality programs may depend upon whether all or some fraction of the subscribers who are currently viewing the lower quality programs have CPE capable of processing the higher quality versions of the programs (see, e.g., discussion of FIG. 3 subsequently herein). For example, to replace a current stream from an SD video stream with its HD version, it may be necessary that all CPE currently receiving that SD stream are capable of processing the HD version of that stream. Such "processing" may include for example either (i) carrying the HD resolution through the CPE, and providing an HD resolution output capable of driving an HD display device (e.g., HDTV), or (ii) down-converting the HD resolution to SD resolution and providing an SD resolution output to drive an SD display.

In another variant, all or part of the excess bandwidth capacity may be used to provide "extra services" or secondary content insertion, as described in co-assigned application Ser. No. 11/800,093 entitled "METHODS AND APPARATUS FOR PREDICTIVE CAPACITY ALLOCATION", previously incorporated by reference. For example, secondary (e.g., non real-time sensitive) content may be "trickle downloaded" using this excess capacity in an opportunistic fashion; see, e.g., co-owned and co-pending U.S. patent application Ser. No. 11/706,620 filed Feb. 14, 2007 and entitled "METHODS AND APPARATUS FOR CONTENT DELIVERY NOTIFICATION AND MANAGEMENT", incorporated herein by reference in its entirety.

Alternatively, a high-speed or "bursted" approach can be used. Exemplary high-speed content download apparatus and methods are described in co-owned and co-pending U.S. patent application Ser. No. 11/013,665 filed Dec. 15, 2004 and entitled "METHOD AND APPARATUS FOR HIGH BANDWIDTH DATA TRANSMISSION IN CONTENT-BASED NETWORKS", incorporated herein by reference in its entirety.

The supervisory process may in one embodiment base its decision on whether or not to replace lower quality programming with higher quality programming and/or extra services per steps 232 and 234 on whether the current bandwidth surplus is expected to persist for some time (e.g., a predetermined or dynamically determined value or percentage), by predicting requested bandwidth some time into the future. For example, the process may use historical information to predict whether a bandwidth surplus sufficient to accommodate a higher quality program is likely to persist for all or a portion (e.g., "most") of the length of that program, as it may be undesirable to change from higher to lower quality and vice versa frequently during a program. A minimum number of switches may be permitted for example; e.g., persistence of X minutes is sufficient if only two or less switches from one format/quality to another are predicted.

As another alternative, switches may be allowed if they occur in certain portions of the program, so as to render them substantially unnoticed, and/or so as to have them affect less critical portions of the program such as during very low-light scenes, scene transitions, intentionally out-of focus scenes, during advertisements, etc. For example, in one variant, the program includes a plurality of markers (e.g., metadata or the like associated with particular SI or other time references within the program stream) that act effectively as gating criteria or windows for the imposition of quality change. If a format or quality change from low-to-high for example occurs outside of window, it will be precluded.

As implied above, persistence can also be measured on non-contiguous (e.g., percentage or other) basis; i.e., does the additional available bandwidth persist for a sufficient portion percentage-wise of the target program, versus whether it persists unabated (or substantially unabated so as to allow delivery of the higher quality version) for a prescribed period of time. Hence, one exemplary metric for switching to the higher quality version may be whether X percent or more of the program can be delivered in HD, irrespective of the number of switches (or alternatively also obeying a maximum number of switches limitation).

Conversely, these persistence evaluations can be applied on a more macro-level; e.g., where delivery of several programs in sequence is used as an evaluation criteria (e.g., whether a full "prime time" session of HD be delivered substantially without interruption or reversion to a lower-quality version, etc.).

The foregoing criteria can also be "masked" by other criteria (or vice versa), including without limitation operational or business policies or rules. For example, even if the excess capacity and persistence described above are suitable to support creation of a new HD program stream, the operational/business rules engine (described below in greater detail) if used may indicate that that particular program stream generates more profit or greater network reliability if left as SD, and hence no switch would be invoked. It will be appreciated that an effectively limitless number of combinations of business rules, operational rules, and/or capacity utilization/allocation rules as described herein may be made, thereby advantageously providing the MSO with a high degree of flexibility and control over the operation of their network.

In the case where not all subscribers currently viewing the program (for example in SD) have the capability to receive and decode HD, other more progressive or incremental approaches to program channel allocation may be used. For example, in one variant, where say m SD versions of the program are currently being delivered (m being an integer greater than 1), the supervisory process may cause n (n being an integer greater than or equal to one) of those SD versions to be replaced with HD versions. However, so as to avoid "dropping" subscribers, those without HD capability may be shifted or forcibly tuned (e.g., via an immediate update to their program mapping table, via existing BSA client protocols, or the like) to another QAM that is carrying the SD version. This approach acts to (i) consolidate more and more SD-only users onto a fewer number of QAMs, and (ii) consolidate more and more HD-capable users onto HD-carrying QAMs, thereby allowing removal of some SD versions of the program. When all remaining SD-only users have tuned away from the program or gone off-line, then all remaining SD versions can be removed.

As other alternatives, a technique know as "re-binding", or alternatively a payload substitution, may be used in place of a forced re-tuning consistent with the invention. For example, in one embodiment, a BSA switch or other device in the network can switch a new source of content (e.g., HD stream in place of SD stream, or vice versa) into an existing program stream, thereby obviating the need for the subscriber's CPE tuner to physically tune to another QAM. Using payload substitution, the payload or encoded content of an existing stream can effectively be replaced. Such techniques are well known to those of ordinary skill in the cable television arts, and accordingly not described further herein.

In another variant, the methods and apparatus of the present invention may be combined or supplemented with those described in co-owned and co-pending U.S. patent application Ser. No. 11/048,348 filed Feb. 1, 2005 and entitled "METHOD AND APPARATUS FOR NETWORK BANDWIDTH CONSERVATION", incorporated herein by reference in its entirety. Specifically, this application discloses methods and apparatus for conserving bandwidth within a network based on two or more different service levels, such as for example HD and SD. In an exemplary embodiment, programming that is simulcast on two or more program channels is mapped to one physical channel during periods when the programming is scheduled at only one service level (e.g., standard definition), thereby conserving bandwidth on the network that would otherwise be consumed by the simultaneous broadcast on the two or more channels. When the programming service level becomes heterogeneous across the channels (e.g., SD and HD simulcast), physical channel(s) supporting the HD content are provided within a local service area only "on-demand" using, for example, a switched digital channel allocation. Accordingly, no HD broadcast occurs within a given area until at least one user requests it, thereby further conserving network bandwidth.

Referring again to FIG. 2a, in the event that the total bandwidth requirements of requested programs exceeds or is predicted to exceed the capacity of the current or predicted to be available bandwidth (i.e., the inverse of the previously described situation) per step 230 of FIG. 2a, the supervisory process may restrict the availability of high bandwidth programs by, e.g., replacing high quality programs with their lower quality equivalents per steps 240 and 242. For example, if some users are currently viewing HD program streams, but the supervisory process determines that the requested bandwidth will soon exceed the available current bandwidth, then the process may schedule a switchover of one or more of those HD users to the SD versions of those program streams for the time at which the required bandwidth is expected to exceed the available bandwidth.

In one embodiment, the number of users scheduled to be switched over to one or more SD versions is determined according to the difference between the total expected input bitrate requirement and total output bitrate capability, e.g., if a shortfall of 25 Mb/s in output bitrate availability is expected, then the supervisory process may reconfigure the system to switch two (2) users from 19 Mb/s HD streams to 7 Mb/s SD streams carrying the same programming content, and subsequently collapsing those streams (assuming no other viewers on those streams). This underscores an important principle and feature of the invention; i.e., the network operator's desire and ability to mitigate deleterious effects on the viewing experience for as many of its subscribers as possible. Specifically, the algorithms of the present invention may be constructed so as to specifically consider the number of viewers on a given channel or QAM at a given time, and use this information in deciding when, where and how many subscribers to migrate. For instance, in one embodiment, the supervisory process identifies (i) how many subscribers are tuned to each of one or more channels, (ii) the capabilities of the relevant CPE associated with these subscribers, and (iii) the formats or bitrates of each channel (e.g., HD or SD, etc.). With a "rule" imposed that the fewest subscriber's services As described below with respect to FIG. 3, the decision to switch a program from HD to SD may also be made dependent upon whether some or all of the CPEs currently receiving that program are capable of up-converting from SD to HD resolution. Up-converting may include, for example, increasing the number if pixels in a video image by resampling that image, followed by sharpening the edges of objects within that image; these and other up-conversion techniques are known to those of ordinary skill in the art and not described further herein. For example, up-conversion capability is available in numerous DVD players designed to play back standard definition DVDs to HD displays with "near HD quality" or the like. Some televisions or displays also have the ability to up-convert SD signals fed into them.

If up-conversion capability is present in a given number or percentage of the CPE (e.g., STB, DVD players, televisions, etc.) currently receiving the program, for example, then fewer users will be impacted by the proposed switch to SD and removal of the HD channel. In the case where all current HD viewers have up-conversion capability, none will be (significantly) impacted, since all will continue to have at least "near-HD" quality. Conversely, if none of the current HD viewers have up-conversion capability, then all will experience a degradation of quality. Hence, knowledge of the number of current viewers that have up-conversion capability (such as might be gained via an MSO database for each subscriber, or communications from each CPE as to its capabilities) can act as the (or a) basis for deciding where and how to "cut" bandwidth demands within the network under conditions where actual or predicted demand exceeds actual or predicted capacity, respectively. For instance, it may be better to cut or reduce other services to subscribers when all or nearly all of the current HD viewers do not have up-conversion, since many people will experience an ostensibly noticeable reduction in quality. Conversely, when all or most all of these HD viewers have up-conversion, there will be very little or no perceptible impact.

As previously noted, while certain aspects of the foregoing discussion is cast primarily in terms of two service levels or formats (i.e., SD and HD), the methods and apparatus disclosed herein can be extended to other numbers and types of service levels. For example, it is foreseeable that yet even higher levels of definition may be employed in the future (e.g., "ultra-high definition" or UHD), thereby allowing intelligent bandwidth conservation between three service levels (SD, HD, and UHD). As another option, multiple levels or rates may be present with one of the aforementioned service levels, such as where the SD format includes formats SD1, SD2, . . . SDn, and/or the HD format similarly includes HD1, HD2, . . . HDn, with each of these sub-formats having different data rates and/or other characteristics. As can be readily appreciated, this approach of multiple sub-formats of service levels affords the supervisory process of the present invention an even greater level of granularity in control, since more service options are available.

Up-Rating/Down-Rating—

Another tool available to the supervisory process (and MSO) described herein comprises a temporary or permanent down-rating of programming (i.e., reducing its bitrate) to allow for more programming to be supported by finite bandwidth, or alternatively up-rating as more bandwidth becomes available. In some embodiments, down-rating or up-rating at different times may be used depending on the content of a given program stream at those times (as well as the loss or gain of available bandwidth as previously described). These up-rating and down-rating processes are to be contrasted with the well known "variable bitrate" or VBR, which allocates more or less bits to various portions of a piece of content (e.g., audio or video file) based on the complexity of a particular portion of that file. For example, under the present invention, a given program channel stream may be up-rated when its content changes from one type to another (e.g., from news to sports), assuming that sufficient added bandwidth is available, and/or down-rated when its content changes in another fashion (e.g., from sports to news or advertising, but not to a movie), irrespective of the actual bitrate used in the encoder to encode the media. In one embodiment, the clamped maximum bitrate of a stream is up-rated or down-rated. Requantization of at least portions of the content may also be performed. The constituent program stream is still VBR in nature (and hence may vary significantly); rather, the clamped rate is adjusted under the exemplary embodiment. These transients can be forced to the content boundaries (e.g., during interstitial periods between the different programs) so as make them imperceptible to the subscriber if desired. Down-rating can also be imposed ad hoc, such as where an immediate and/or unanticipated reduction in capacity occurs; e.g., equipment failure, etc.

The supervisory process may also base it decision on whether or not to up-rate or down-rate streams based on predictions of future bandwidth availability. For example, such predictions may be based on historical bandwidth availability data as previously described herein.

Similarly, the method of FIG. 2a (and also those of FIGS. 2 and 3 herein) may create in advance and selectively substitute multiple versions of programming at various quality levels, e.g., various bitrates. The supervisory process may down-rate or up-rate the stream carried based on e.g., demand for bandwidth. For example, in some embodiments, where available bandwidth is decreasing, lower clamping bitrates may be imposed (along with requantization if desired) to fit within the currently available or projected bandwidth. Alternatively, a version of the content encoded according to another scheme can be substituted (e.g., H.264 substituted for MPEG2). This may produce at least a subscriber-perceptible switching transient during the transition from the first encoding to the second, although this may only last for a brief period (e.g., a second or so). A buffering system of the type well known in the data transmission arts can be employed to buffer enough of the content of the first encoder format so as to extend beyond the time when the second encoded format comes online, thereby effectively making the switch seamless from the subscriber's perspective.

Several versions of the content at various quality levels may be generated and supplied to the network either well in advance of expected usage (e.g., "offline"), or "just in time" for usage, and as bandwidth demand varies, an appropriate version may be selected based on service provider policies. This selection and substitution may be inter- or intra-program; i.e., up-rated or down-rated versions may be substituted at period (e.g., primetime) or program boundaries, such as after the completion of a program, or during delivery of that program, such as at a commercial, opportunistic scene change where the transition will not be noticed, or even on "call" such as when the all users have tuned away.

As previously noted, many existing systems convert variable bitrate (VBR) digitally encoded program streams to constant bitrate (CBR) program streams to facilitate multiplexing of those program streams to form higher rate streams more suitable for conveyance on a service provider's transmission facilities. A variable bitrate (VBR) encoded digital video stream may be converted to constant bitrate (CBR) streams by reducing its bitrate when it exceeds a target CBR, or adding null bits to it when its bitrate falls below the target CBR; this is referred to as "clamping" the stream. This clamping is performed by or after encoding, but before multiplexing the program stream with other program streams.

Accordingly, the methodology of the present invention further contemplates providing a number of versions of program streams clamped to different CBRs. For example, MPEG encoded versions of the Cartoon Network clamped to 3.0 Mb/s, 3.5 Mb/s, 4.0 Mb/s and 4.5 Mb/s may be provided. The supervisory process may switch (down-rate) the Cartoon Network stream provided to a service group from its 4.5 Mb/s version to its 4.0 Mb/s version to its 3.5 Mb/s version, and finally to its 3.0 Mb/s version, as bandwidth available to that service group becomes progressively more and more constrained. The method may also include subsequently switching (up-rating) the Cartoon Network stream provided to a service group from its 3.0 Mb/s version to its 3.5 Mb/s version to its 4.0 Mb/s version, and finally to its 4.5 Mb/s version, as bandwidth available to that service group becomes progressively less and less constrained. This is just one example—in other examples the transitions from one version of a stream to another may skip over intermediate versions, e.g., switch directly from the 4.5 Mb/s version to the 3.0 Mb/s version. Down-rating or up-rating may also be long lasting, e.g., unlike in the above example, a program stream may not necessarily be up-rated after being down-rated, even when sufficient bandwidth to up-rate it becomes available.

As previously indicated, one salient capability offered by the exemplary embodiment of the invention is the ability of the system not only to down-rate and up-rate content bitrates, but also to know when to perform such rate changes. For example, one variant of the invention uses a priori knowledge of content bitrate profiles via metadata or the like (see, e.g., co-owned and co-pending U.S. patent application Ser. No. 11/881,034 filed Jul. 24, 2007 (contemporaneously herewith) and entitled "GENERATION, DISTRIBUTION AND USE OF CONTENT METADATA IN A NETWORK", incorporated herein by reference in its entirety), to provide a "look-ahead" capability for the bitrates of the program stream under evaluation, as well as other streams in the multiplex if desired. Alternatively, a predictive analysis of historical tuning and/or bandwidth consumption data such as that described in co-owned and co-pending U.S. patent application Ser. No. 11/243,720, entitled "SELF-MONITORING AND OPTIMIZING NETWORK APPARATUS AND METHODS", also incorporated by reference herein in its entirety, may be employed consistent with the present invention, and even in conjunction with the aforementioned bitrate profile metadata. Moreover, the system of the present invention can intelligently and dynamically select content encoding or resolution formats to switch to when bitrate or other changes are needed, as previously discussed.

Capabilities-Based Methods—

Figure 3:
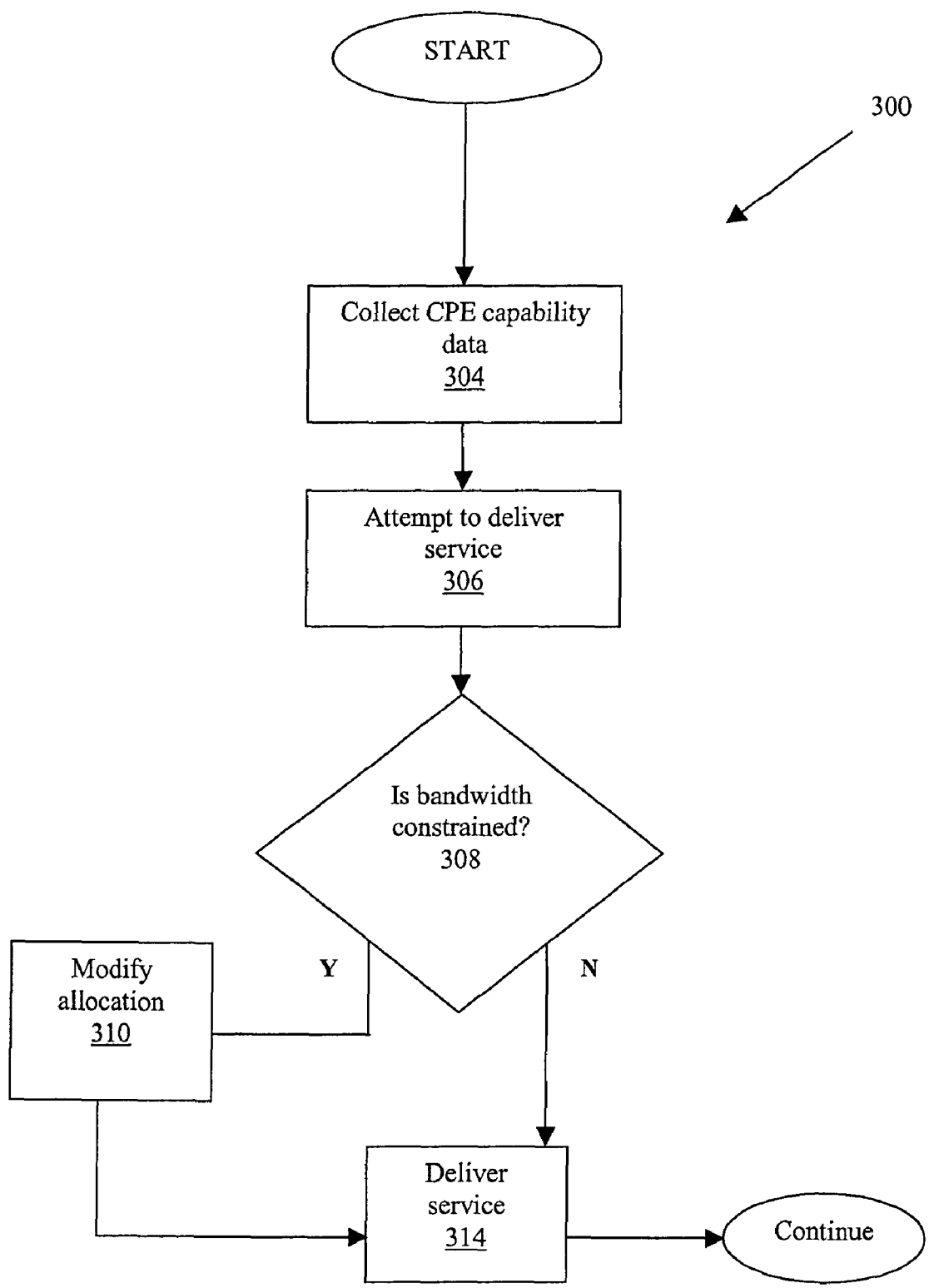
FIG. 3 is a logical flow diagram illustrating one exemplary embodiment of the generalized method of program allocation based on capabilities information according to the invention.

FIG. 3 is a logical flow diagram illustrating an exemplary embodiment of a method 300 of providing service based on capability information according to the present invention.

First, content format capability information is collected for or from each relevant CPE per step 304. Such information may include e.g., the types of codec or decoding capabilities maintained by a given CPE (including optionally the version of a codec actually installed), the type of CPE (from which the codec or decoding capabilities can be divined using for example a stored CPE profile, etc.). An MSO database or similar mechanism describing CPE capabilities may be consulted to obtain this capabilities information, or the CPE actively polled or queried as to their existing capabilities. See also the methods and apparatus disclosed in co-owned and co-pending U.S. patent application Ser. No. 11/363,577 filed Feb. 27, 2006 and entitled "METHODS AND APPARATUS FOR SELECTING DIGITAL CODING/DECODING TECHNOLOGY FOR PROGRAMMING AND DATA DELIVERY", incorporated by reference herein in its entirety, which may be used consistent with the present invention in order to identify and effectively utilize CPE capabilities.

In another variant, the performance of the CPE can be evaluated remotely such as sending a test portion of content encoded in a particular format, to determine whether any errors are generated, reboots or lockups occur, etc., thereby indicating that the test portion could not be played by the CPE.

In still another variant, the capabilities can be estimated based on historical information such as tuning habits. For example, if a given CPE has historically never tuned to an HD program, then it is generally a good assumption that they do not have an HD-capable receiver. Similarly, CPE that tune to HD and SD programs are presumed to have both an HD receiver and HD display, and no up-conversion. Note that in order to maintain privacy, such tuning habit data can optionally be obtained on an anonymous basis (such as e.g., using an "opaque variable" comprising a cryptographic hash, etc. as described elsewhere herein).

Second, per step 306, an attempt to deliver a service is initiated, and pursuant thereto, excess capacity (e.g., bandwidth) availability; i.e., available bandwidth versus demand, is evaluated in order to identify any constraints (or excesses) per step 308. If it is determined that sufficient capacity is indeed available or predicted to be available at the desired time(s), then the service will be delivered per step 314. Otherwise, if it is determined that capacity (e.g., bandwidth) is indeed constrained or will be constrained, the operational profile of the network is then modified per step 310. Profile modification includes, e.g., supplementing lower-bandwidth standard definition (SD) service in place of high definition (HD) service, or alternatively HD service for SD service (e.g., consolidation of users onto a fewer number of channels, and removal of unused SD services), up-rating or downrating content, etc. as previously described.

Figure 3A:
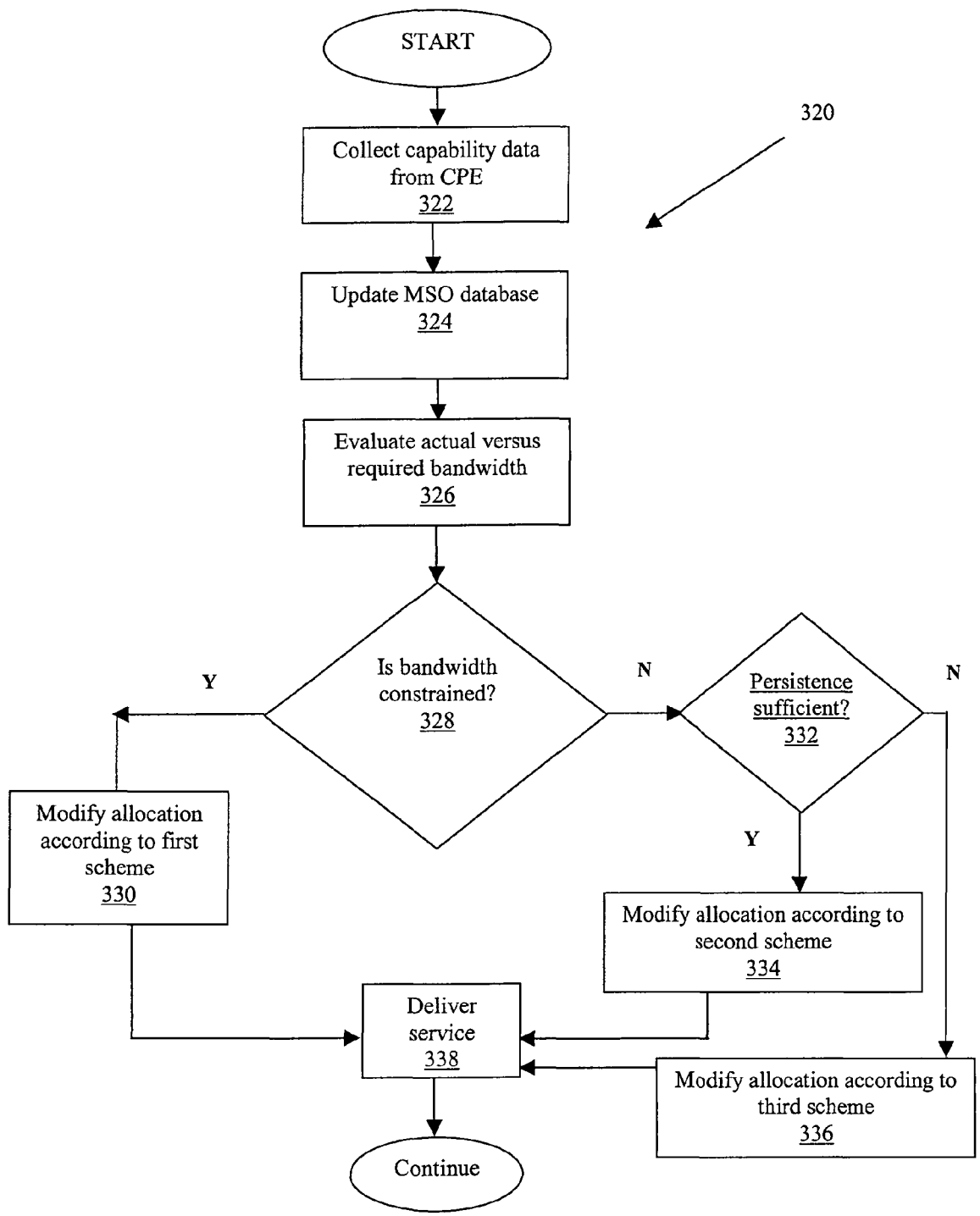
FIG. 3a is a logical flow diagram illustrating one exemplary embodiment of the program allocation methodology of FIG. 3.

FIG. 3a illustrates another variant of the method of providing service based on capability information according to the invention. As shown in FIG. 3a, capability information is first collected from the CPE 106 per step 322, such as via upstream communication pursuant to initial installation, a polling operation, occurrence of an event in the CPE (e.g., power-up), etc. Per step 324, the MSO or other database is optionally updated with that newly obtained information. Next, per step 326, the actual versus required bandwidth (which may include predictive quantities) is evaluated as previously described in order to determine whether bandwidth is or will be constrained.

If bandwidth is constrained per step 328, the program (and/or bandwidth) allocation is modified according to a first scheme per step 330. Such a scheme may comprise e.g., substituting a lower bandwidth version of a program for the existing higher bandwidth version at a prescribed point in time, or conversely consolidating viewers onto higher-quality existing streams and removing a lower quality stream.

Alternatively, if bandwidth is not constrained, persistence is evaluated per step 332 as described elsewhere herein, and if sufficient, the program/bandwidth allocation is modified according to a second scheme per step 334. This may include, e.g., replacing a lower-quality version of a program with a higher-quality version, utilizing the excess bandwidth for opportunistic "secondary" content delivery, high-speed burst downloads, etc. If the persistence (or other parameter) is not deemed sufficient per step 332, then a third allocation scheme is imposed, which may in one variant simply comprise maintaining the status quo.

Lastly, the requested service is delivered per step 338.

The aforementioned supervisory process may also include the ability to identify or "profile" the capabilities of individual CPE, including e.g., up-conversion capability (as previously discussed), types of codecs installed, processing capability, storage capacity, presence of HDTV displays, presence of SD or HD receivers, etc. Alternatively, this identification or characterization of CPE profile may be handed off or delegated to another network entity or process. This CPE capabilities or profile information can be obtained from any number of sources, including e.g.: (i) a local or remote MSO database, such as one which associates specific subscribers or CPE with capabilities (e.g., that were recorded at time of installation or later); (ii) dynamic interaction with the CPE and/or subscriber (e.g., queries, polling, etc. to/from the CPE during operation, or user-interactive menus or GUIs); or (iii) consulting a third party, such as an Internet website maintained by the CPE manufacturer with a description of the CPE capabilities.

The supervisory process may use knowledge of CPE capabilities to determine which of two or more possible candidate versions of programs to convey to particular CPE. For example, the supervisory process may know that certain portable devices (e.g., wireless handhelds or the like) may only be able to ingest video data at a certain bitrate, which may be substantially lower than the bitrate at which a set top box (STB) at the user's premises may be able to ingest that same data. Accordingly, a lower bitrate or down-rated version of a higher rate program may be selected in order to optimize playback by the portable device.

As part of system initialization procedure, for example after a CPE is powered up or at a prescribed event or periodicity, a CPE may provide its capabilities to the supervisory process. A CPE may also wait for a user action such as a button push to send data describing its capabilities to the supervisory process, or use a randomized process, for example to avoid a situation where all CPE in a system attempt to send data describing their capabilities to the supervisory process simultaneously after a power outage, or other such event which might trigger an upstream transmission of capabilities information. As another alternative, a polling procedure or schedule may be used, such as where CPE are polled periodically (i.e., once per week, once per month, etc.) for updated configuration information. The resident operating system or middleware of the CPE may also be employed to alert an upstream entity of a configuration change, such as where a hardware or software registry within the device is altered by the addition or subtraction of a new component, application etc. See, e.g., co-owned and co-pending U.S. patent application Ser. No. 10/723,959 filed Nov. 24, 2003 entitled "METHODS AND APPARATUS FOR HARDWARE REGISTRATION IN A NETWORK DEVICE" which is incorporated herein by reference in its entirety, for exemplary mechanisms by such a registry can be managed and implemented. This approach is particularly useful from the standpoint that many CPE are modified in terms of hardware or software after installation (e.g., as new applications are added, and old ones destroyed by the monitor application or middleware), and hence the information obtained dynamically from the CPE is most current and relevant to the supervisory process.

The supervisory process may determine the decoding capabilities of the CPE using the aforementioned techniques as well. With this knowledge, the supervisory process may determine that at a certain time, bandwidth may be freed-up for reallocation. For example, the supervisory process may determine that at a certain time the viewers of a certain program channel whose terminals have only MPEG2 decoding capability will cease viewing that program channel. The supervisory process may then switch the input of that program channel from its MPEG2 version to its MPEG4 audio video control version, possibly achieving a large (e.g., 50%) reduction in the bandwidth required to carry that program channel, with no loss in perceived quality. Conversely, the supervisory process may determine that user terminals with only MPEG2 capability may come on line at a certain time, and switch from the MPEG4 audio video control version of a program to its MPEG2 version in time to support those MPEG2 terminals.

The foregoing process can also be extended to multiple channels based on "forced migration" of users. For example, if three (3) channels of a given program are being offered, one in MPEG4 and two in MPEG2 format, and there is only one or two CPE viewing one of the two MPEG2 channels, then those users can be forcibly tuned to the other MPEG2 channel in order to consolidate, and the second MPEG2 channel reclaimed or switched to MPEG4 (or yet another format depending on extant network conditions and demand).

Similarly, CPE with multiple codec capability can be identified and used as a basis for channel switching or program format substitution. Such CPE comprise in certain cases a "don't care" logical entity in terms of deciding between two or more different formats or bitrates, and hence provide added flexibility to the supervisory process in terms of channel and/or format allocation. To some extent, HD-capable devices are of this type, since they can receive both HD and SD programming (and display either assuming an HD-capable display device is present). However, there is a distinct benefit to the MSO by affording programming in HD versus SD in terms of user satisfaction and enjoyment; to the contrary, when choosing between two different codecs or bitrates, the benefits may be largely imperceptible to the user, and only accrue to the MSO (i.e., reduced bandwidth, etc., as in the above-described case of MPEG2 versus MPEG4)

As another example, the supervisory process may know the display capabilities of the user terminals, and use this knowledge to provide a program at a lower or higher bitrate, using the same encoding standard. For example, the supervisory process may switch or transition a set of user terminals from receiving a version of a program encoded using MPEG4 audio video control at 2 Mb/s to receiving a version encoded using MPEG4 audio video control at 200 kb/s, if the supervisory process determines that after the switching time, only portable devices will be viewing that program. In effect, the added bitrate of the 2 Mb/s version is wasted on the lower-resolution portable devices.

It will further be appreciated that the evaluation of capability and capacity constraint information can be effected on an average or statistical basis rather than a per-CPE basis if desired. For example, if the total projected demand for a set of CPE is greater than the available capacity at a given time (or projected into the future), the supervisory process may be used to perform profile modification irrespective of specific CPE (and their capabilities) being tuned to a given program channel. Under the previously described embodiment, the capabilities of each (or at least some) of the relevant or impacted CPE were considered in order to determine the appropriate profile modification; i.e., the profile which would produce a desired result such as maintaining user satisfaction by avoiding any perceptible interruption or loss of quality to particular CPE. However, in the even that such fine level of granularity for CPE capability information is not available (or desired to be used for whatever reason), the supervisory process can impose profile modifications that may cause program disruption or loss of quality for a given percentage of users, yet on average increase quality or opportunities for higher-quality viewing across the broader subscriber base. This might be used, for example, in the case of a sudden change in capacity (such as due to an equipment failure or the like), or where it is known that the disruption or loss of quality will only be transient in nature. This approach advantageously obviates the need for individual CPE or display capabilities information, relying instead on a statistical or estimated profile of the subscriber base (e.g., 50% have HD receivers and HD displays, 25% have up-conversion capability in an SD receiver, and 25 have SD-only, etc.).

CPE 106 may also include the capability to store programs, such as e.g., via an incorporated mass storage device, or associated DVR. The supervisory process described herein may transfer programs to CPEs with such storage capability at bitrates higher or lower than the bitrates that would be used to display those programs in real time, based upon knowledge of CPE capabilities and current system bandwidth constraints. For example, a CPE with storage capability may be able to ingest programs at a bitrate much lower than the bitrate that would be used for streaming programs to that CPE in real time, such as for viewing by the user. That CPE may then replay programs ingested at low bitrates at higher bitrates for purposes of, e.g., display of those programs to users. Alternatively, programs may be ingested by that CPE at bitrates higher than bitrates required for real-time display of those programs, allowing transient periods of higher bandwidth availability to be used to download programming to that CPE (such as via the high speed download methodologies described elsewhere herein). Alternatively, that CPE may transfer one or more of those programs to other devices, at bitrates either above or below real time display bitrates. Accordingly, the supervisory process of the present invention can be configured to accommodate and utilize these varying bitrates, such as via (i) down-rating or up-rating a given version of the content, (ii) delivering it in one of a plurality of different formats, (iii) transcoding it, and/or (iv) using a selected one of a plurality of delivery paradigms (e.g., trickle or opportunistic delivery, high-speed session based download, etc.) in order to optimize network operation or other desired attributes.

It will also be recognized that while the foregoing embodiments are described substantially in terms of a single or aggregated supervisory process that implements the various methodologies of the invention, such process may in fact be distributed in nature (e.g., across two or more software processes and/or platforms, such as in a distributed application (DA) or client-server architecture of the type well known in the software arts), and some of the "intelligence" associated with the supervisory process allocated or resident on the CPE 106 itself. For example, in one alternative embodiment, the CPE 106 each comprise a client portion of a DA which communicates with a network portion of the DA using, inter alia, interprocess communications over the network 101, and which performs at least some of the processing required by the supervisory process as a whole. For instance, the CPE may act as distributed processors or pre-processors for capabilities or historical tuning/usage data, so as to off-load this processing from the network (e.g., server) portion of the DA. APIs or other such mechanisms may also be provided at the client in order to allow the MSO or other entity to remotely retrieve historical or tuning/use data, logged errors (see, e.g., co-assigned U.S. patent application Ser. No. 10/722,206 entitled "METHODS AND APPARATUS FOR EVENT LOGGING IN AN INFORMATION NETWORK" filed Nov. 24, 2003, incorporated herein by reference in its entirety, for one exemplary CPE error reporting, logging, and correction system), perform CPE/monitor reconfiguration, application installation or destruction, etc. Delayed delivery notification such as that previously described herein may also be accomplished by the client portion if desired.

In certain embodiments, the present invention maintains subscriber privacy (e.g., for both legal and commercial reasons) using a mechanism to anonymously identify and associate data such as historical tuning data, CPE capabilities and software installed, etc. with particular CPE (and hence individual subscriber accounts). In one embodiment, subscriber identities are optionally protected by hashing or encryption of the tuner address or the like prior to logging and storage. The stored "hashed" address or other parameter (e.g., TUNER ID) and associated events are therefore not traceable to a particular user account. The resulting obscured tuner address is repeatable so the necessary tuning location and user activity tracking may be performed while still maintaining complete anonymity. Alternatively, all or portions of the user-specific (albeit anonymous) information may be stripped off before storage of the activity or configuration data within the historical database. See, e.g., co-owned and co-pending U.S. patent application Ser. No. 11/186,452 filed Jul. 20, 2005 and entitled "METHOD AND APPARATUS FOR BOUNDARY-BASED NETWORK OPERATION", which is incorporated herein by reference in its entirety, for exemplary implementation of such anonymous mechanisms. Accordingly, the MSO (or supervisory process itself) can evaluate individual CPE 106 according to an activity or configuration analysis gleaned from that particular CPE (i.e., on a per-CPE basis) if desired.

Alternative Approaches—

In addition to the aforementioned program format selection and allocation strategies (i.e., substituting one format for another, up-rating or down-rating content, user migration, etc.), adjustments to other network operation parameters may be employed as well. For example, in the context of the exemplary BSA network, parameters such as: (i) total stream pool size by service area; (ii) individual channel reclamation times; (iii) individual channel "on" times; and (iv) priority of QAM resource allocations between multiple services contending for these resources (such as e.g., BSA and VOD systems), can be used in conjunction with the aforementioned format selection and allocation to achieve desired operational goals.

As another alternative in the case where demand exceeds actual (or predicted) capacity, delivery of one or more program streams can be delayed or otherwise manipulated. See, e.g., co-owned and co-pending U.S. patent application Ser. No. 11/706,620 filed Feb. 14, 2007 entitled "METHODS AND APPARATUS FOR CONTENT DELIVERY NOTIFICATION AND MANAGEMENT", incorporated herein by reference in its entirety, for exemplary methods and apparatus for delayed content delivery and notification to subscribers of a content-based network, although it will be appreciated that other methods and apparatus may be substituted with equal success. This referenced approach can be used, for example, in order to facilitate the management of content requests by subscribers via utilization of a real-time or delayed delivery notification mechanism. In one exemplary embodiment, content is requested by the subscriber during a time (or for a time) where the network capacity or bandwidth available for delivery of that content is limited, and a notification is accordingly sent to the subscriber to alert them of a potential unavailability of requested content. The subscriber may be offered the choice to either cancel the request or to accept delayed delivery of the requested content, for example. Numerous variants on this basic scenario are also described, including inter alia: (i) providing the subscriber with a projected delivery or availability time for the requested content (either via the requesting modality; e.g., set-top box and cable network interface, or via another communication channel); (ii) allowing the subscriber to specify a date and/or time of delivery, such as one convenient to them; (iii) providing the subscriber with a "content ready" notification when the content is actually ready for delivery; (iv) automatically programming or operating the subscriber's CPE or connected devices based on projected or actual delivery information. In another variant, the subscriber is provided with the opportunity to "trickle" download the content (which may in certain cases be at an unpredictable rate, and/or be completed at an unpredictable time), or download at a time solely determined by the network operator, in exchange for, e.g., a discount or other such consideration. This approach allows the network operator an added degree of control and flexibility in managing network bandwidth, since such requests can be serviced opportunistically.

Even when not delayed, notification of format or bitrate switches can be made using the aforementioned techniques (or others). For example, in cases where HD content is being switched in, the user's display might include a small screen-corner icon, and/or an audible tone sounded, to alert the user that HD is available.

VOD Variants—

Additionally, it will be recognized that the methods and apparatus disclosed herein may be applied to video-on-demand (VOD) delivery paradigms. For example, in one embodiment, multiple stored versions of a VOD program (e.g., each encoded at different bitrates) may be accessible by a service provider. For instance, versions of a standard definition (SD) video program encoded at 3 Mb/s, 3.75 Mb/s, and 4 Mb/s may be stored for use or selection by the supervisory process. Although SD VOD programs may typically be streamed to users at 3.75 Mb/s, where perhaps, 3.75 Mb/s is typically used to simplify multiplexing of VOD programs with other VOD or non-VOD programs, the supervisory process may at times selectively provide one or more VOD programs at 3 Mb/s or 4 Mb/s each, according to currently available, or predicted to be available, bandwidth. Alternatively, different versions having different encoding formats or other variable attributes may be selected by the supervisory process depending on the desired outcome.

The methods and apparatus of the present invention may also be combined or supplemented with those described in co-owned and co-pending U.S. patent application Ser. No. 10/881,979 filed Jun. 29, 2004 and entitled "METHOD AND APPARATUS FOR NETWORK BANDWIDTH ALLOCATION", incorporated herein by reference in its entirety. Specifically, in one aspect, the aforementioned application discloses methods and apparatus for "intelligently" allocating bandwidth according to multiple different service levels or data rates in a network. In the exemplary embodiment, a service resource manager (SRM) is provided which allocates bandwidth to session requests having different data rates (e.g., HD and SD) on two or more downstream channels (e.g., 4 RF QAM channels in a service group). This intelligent allocation scheme achieves multiple goals, including (i) increasing the likelihood of having the capacity to provide HD bandwidth within a Service Group to an HD VOD session request, and (ii) minimizing the chances of stranding bandwidth within a channel or service group.

Specifically, the invention optimizes load balancing across QAM channels, as well as maximizing HD session support through use of Least-Loaded and Most-Loaded allocation algorithms in conjunction with a plurality of user-definable variables which control operation of the SRM. The SRM and variables also allow for dynamic tuning of the network under varying service and load conditions in order to further its operation. Spreading of HD VOD sessions across different QAM channels within the service group also advantageously minimizes the impact of QAM failures on VOD sessions.

Software Architecture—

Referring now to FIGS. 4a-4b, exemplary embodiments of the software architecture useful with the present invention are described in detail. It will be appreciated by those of ordinary skill that while four exemplary embodiments are described herein, other variations and combinations of the following architectures may be utilized depending on the desired attributes and network topology in use.

As shown in FIG. 4a, a first embodiment of the architecture comprises a network portion 402, which effectively functions as a supervisory process, and is in logical communication with a database 406, as well as other network equipment and processes (not shown) in order to effectuate the supervisory process methods and policies as previously described. For example, in one variant, the supervisory process 402 is in direct or indirect communication with a BSA switching hub process (not shown) in order to implement program allocation policies. The aforementioned network portion may for example be combined with other network management entities (such as the entity 198 of FIG. 1c previously described), or may be stand-alone in nature.

As shown in FIG. 4a, not all "subnetworks" in the network need be included within the purview of the supervisory process 402; rather, the methodologies previously described may be implemented on a per-subnetwork (or per-node) basis if desired, although clearly the entire network can be included as well.

It is noted that in the embodiment of FIG. 4a, no dedicated client processes or portions (e.g., CPE software) are used; the supervisory process 402 analyzes data it obtains from the database 406 (or other such sources) in order to derive its channel or program allocation policies. For instance, the process 402 may access the database 406 in order to determine codec capabilities for each CPE 106 of interest based on e.g., manufacturer/model, installation configuration data, etc. The BSA server logs that are based on the client-server interactions as previously described may also be utilized for e.g., determination of a "predictive" program lineup for that node, estimation of predicted demand, or even indirect assessment of CPE configuration as described elsewhere herein.

As shown in FIG. 4b, a second embodiment of the software architecture comprises a plurality of network portions 402a, 402b, in this example disposed at the headend 150 and one or more hubs of the network, respectively. The various network portions 402a, 402b are in logical communication with one another (or at least the hub portions 402b with the headend portion 402a), thereby allowing for sharing of information. The aforementioned database 406 may also be used to provide information relating to CPE configuration, etc. as in the embodiment of FIG. 4a, thereby obviating the use of client portions within the network. Use of hub network portions 402b as illustrated also allows for a finer level of control; i.e., each hub process 402b can in one variant control program allocation in a substantially autonomous fashion from other hubs if desired. This is to be distinguished from the embodiment of FIG. 4a, wherein the hubs, while in one embodiment in communication with the headend process 402a, have no real innate "intelligence" of their own with respect to implementation of the program allocation methodologies previously described. Rather, the hubs (and other device) of the embodiment of FIG. 4a act merely as slaves to implement headend process policies or directives.

Moreover, in the event of a failure or problem with the headend portion 402a, the individual hub portions 402b can continue to operate (and optionally communicate with one another directly), thereby providing a degree of fault tolerance and redundancy. To this extent, it will be recognized that another variant of the invention utilizes only the hub portions 402b (i.e., without the headend portion 402a) in this fashion, with either local individual databases, or logical connection directly to the "master" database 406. (not shown).

As shown in FIG. 4c, yet another embodiment of the software architecture of the invention comprises a headend portion or process 402a in logical communication with client (e.g., CPE) portions 404 disposed on all or a subset of the CPE within the network. Such subsets may be organized based on subnetwork/node as shown, or using another scheme. These client portions 404 act as remote proxies for the headend process 402a, allowing the MSO to control at least aspects of the operation of the CPE 106 having such client portions 404, including notably the collection of codec, hardware, and other configuration information, as well as historical data and tuning information from the CPE. This approach has the advantage that the MSO can gather much more accurate and relevant information about an individual CPE, including the operation thereof over time. For example, the headend process 402a can periodically poll the client portions to determine operational status, what channel is currently being tuned to, recent errors that have been logged (e.g., inability to play a certain format of content, resource contention, etc.), and even invoke corrective action if desired. For instance, such corrective action might constitute download of a new codec or driver, and/or destruction of an existing application on the CPE. Modifications or upgrades to the middleware or monitor application can also be performed based on data gleaned from particular CPE. The client portion 404 can also be used to generate notifications, interactive displays or queries on the user's display device or other output device as previously described (e.g., delay notification, request for input regarding display device configuration, etc.). Hence, the client portion 404 of FIG. 4c provides the MSO with a "point of presence" within each CPE as well.

Figure 4D:
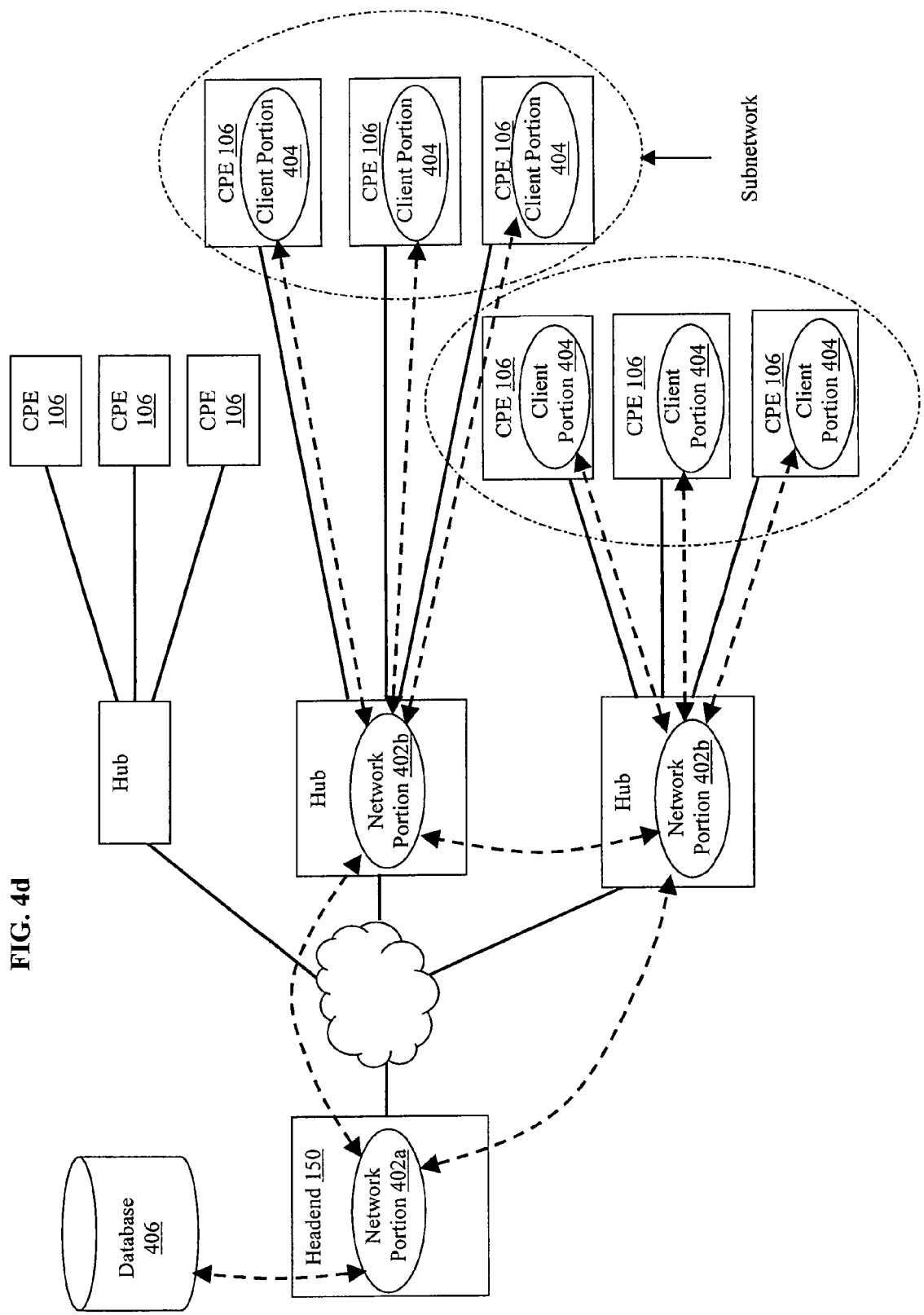
FIG. 4d is a block diagram illustrating a fourth exemplary embodiment of a network software architecture according to the present invention.

Referring now to FIG. 4d, yet another embodiment of the software architecture is disclosed, wherein both client portions 404 and headend/hub network portions 402a, 402b are utilized. This hybrid approach provides essentially all of the benefits of the embodiments of FIGS. 4b and 4c previously described, yet at the price of somewhat greater complexity.

Network Server—

Figure 5:
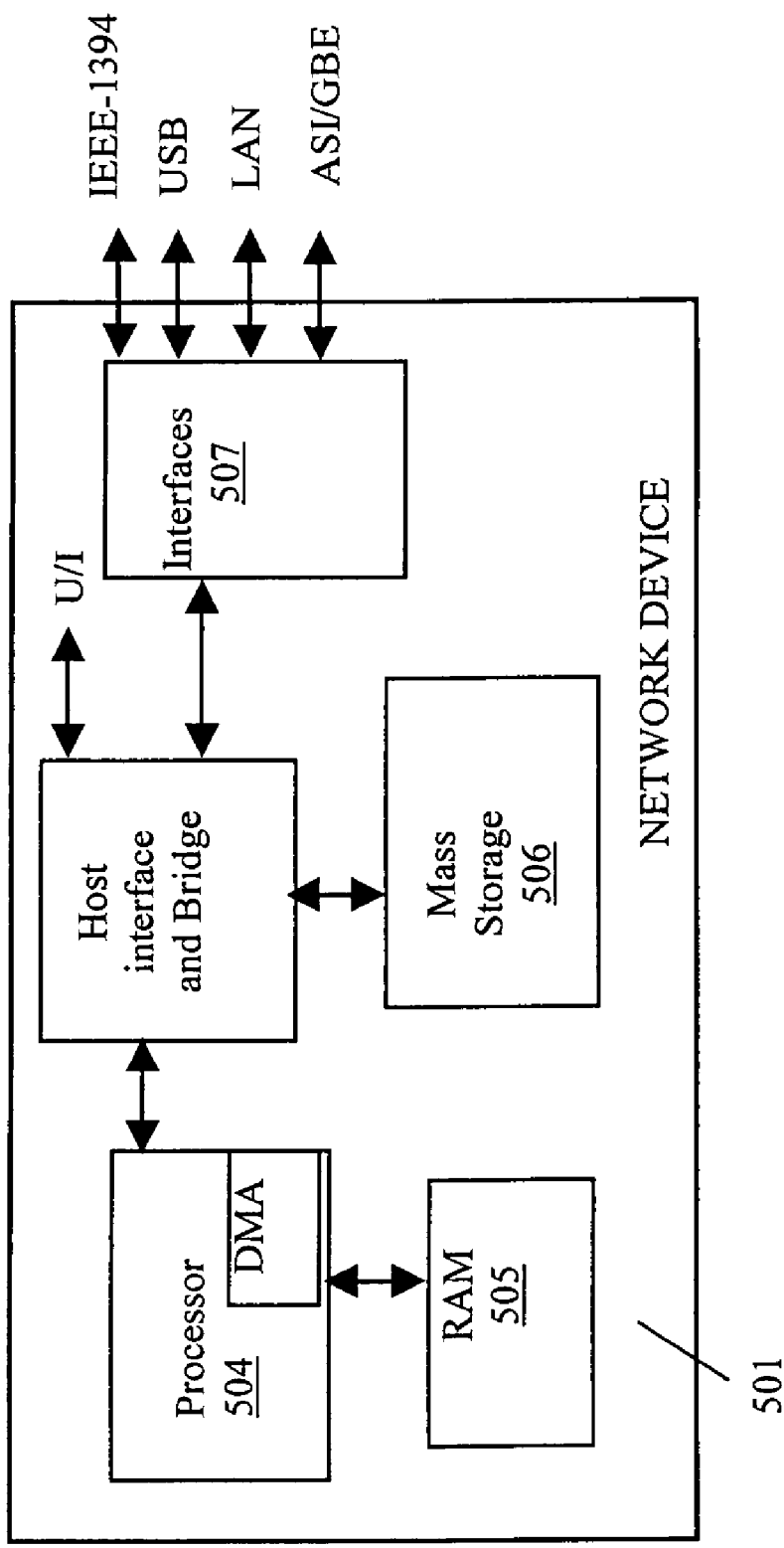
FIG. 5 is a functional block diagram illustrating an exemplary embodiment of a network device with format evaluation and selection functionality according to the invention.

Referring now to FIG. 5, one embodiment of an improved network (e.g., server) device with program format evaluation and selection capability according to the present invention is described. As shown in FIG. 5, the device 501 generally comprises and OpenCable-compliant BSA network server module adapted for use at the hub site of FIG. 1c, although the server may comprise other types of devices (e.g., VOD or application servers) within the network as previously described, including those at the headend 150.

The device 501 comprises a digital processor(s) 504, storage device 506, and a plurality of interfaces 507 for use with other network apparatus such as RF combiners, IP routers and other packet network devices, network management and provisioning systems, local PCs, etc. Other components which may be utilized within the network device 501 include amplifiers, board level electronic components, as well as media processors and other specialized SoC or ASIC devices. Support for various processing layers and protocols (e.g., 802.3, DOCSIS MAC, OOB channels, DHCP, SNMP, H.323/RTP/RTCP, VoIP, SIP, etc.) may also be provided as required, such as in support of data and "rules" interchange between the network device 501 and the CPE. The supervisory process software (e.g., the hub portion 402b of FIGS. 4a-4d) is also disposed to run on the server module 501, and can be configured to provide a functional interface with the headend or client processes 402a, 404 on the network CPE 106 (where used), or other interposed or remote entities. These components and functionalities are well known to those of ordinary skill in the cable and embedded system fields, and accordingly not described further herein.

The device 501 of FIG. 5 may take any number of physical forms, comprising for example one of a plurality of discrete modules or cards within a larger network edge or hub device of the type well known in the art. The server may also comprise firmware, either alone or in combination with other hardware/software components such as those previously described (e.g., disposed in the aforementioned edge device). Alternatively, the device 501 may be a stand-alone device or module disposed at the hub or other site, and may even include its own RF front end (e.g., modulators, encryptors, etc.) or optical interface so as to interface directly with various portions of the HFC network 101. Numerous other configurations may be used. The device 501 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, the format evaluation and selection functionality described above may take the form of one or more computer programs (e.g., the network and client processes, 402, 404). Alternatively, such computer programs may have one or more components distributed across various hardware environments at the same or different locations, such as where the network process 402 is distributed across multiple platforms at the hub site and the headend 150 as shown in FIGS. 4b and 4d.

As yet another example, portions of the functionality may be rendered as a dedicated or application specific IC having code running thereon. Myriad different configurations for practicing the invention will be recognized by those of ordinary skill in the network arts provided the present disclosure.

CPE—

Figure 6:
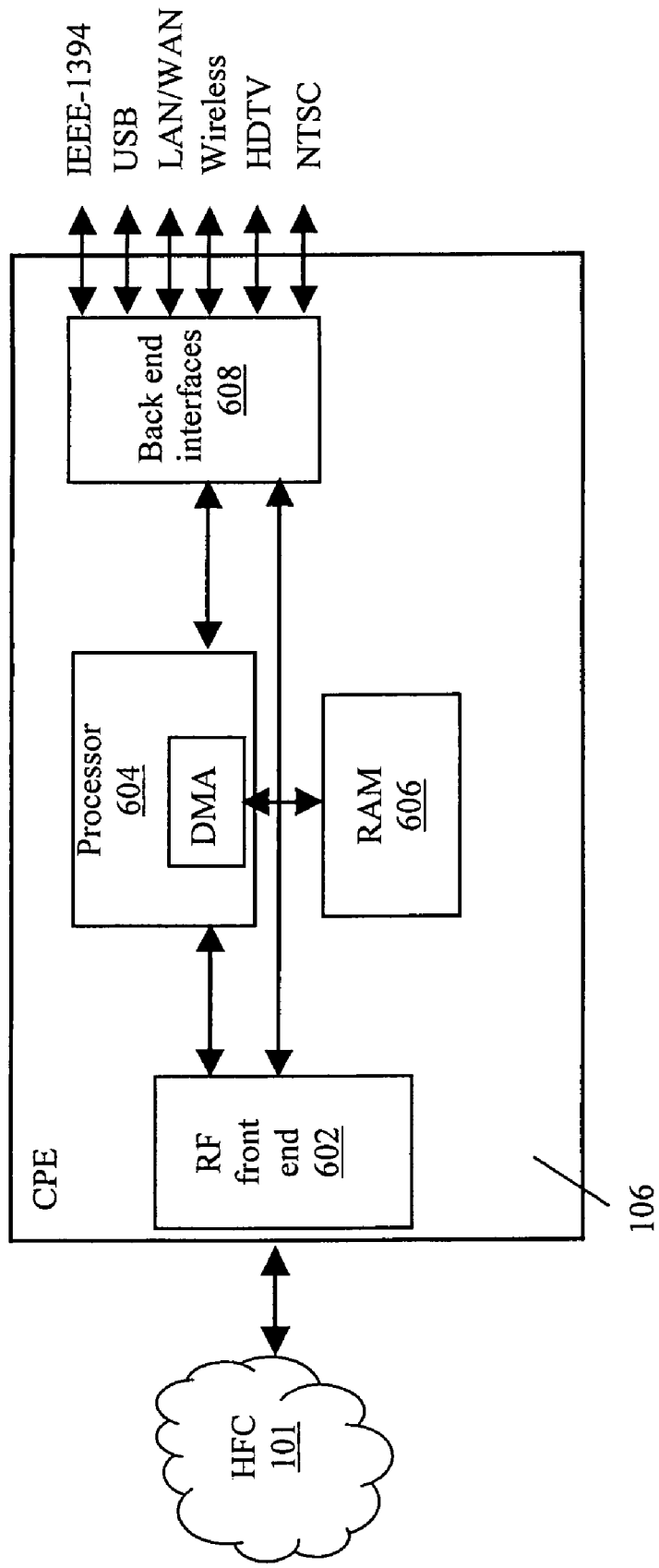
FIG. 6 is a functional block diagram illustrating an exemplary embodiment of CPE adapted to support network format evaluation and selection functionality.

FIG. 6 illustrates an exemplary embodiment of the improved CPE 106 according to the present invention. As shown in the simplified diagram of FIG. 6, the device 106 generally comprises and OpenCable (OCAP)-compliant embedded system having an RF front end 602 (including tuner and demodulator/decryptors) for interface with the HFC network 101 of FIGS. 1-1c, digital processor(s) 604, storage device 606, and a plurality of interfaces 608 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 6 for simplicity) various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 6 is also provided with an OCAP 1.0-compliant application and Java-based middleware which, inter alia, manages the operation of the device and applications running thereon (including the client process 404 where used). It will be recognized by those of ordinary skill that myriad different device and software architectures may be used consistent with the tuning functions of the present invention, the device of FIG. 6 being merely exemplary. For example, different middlewares (e.g., MHP, ARIB, or ACAP) may be used in place of the OCAP middleware of the illustrated embodiment.

The exemplary CPE 106 further comprises a conventional "Watch TV" application or the like, which services those program or user channels available over the network. The Watch TV application, residing in memory, provides such functions as channel navigation control, channel selection in response to a channel change event, etc. In one embodiment, the Watch TV (or EPG) application further comprises all necessary functionality need to support the client process 404.

In another embodiment, the CPE 106 comprises a converged premises device, such as for example that described in co-owned and co-pending U.S. patent application Ser. No. 11/378,129 filed Mar. 16, 2006 and entitled "METHODS AND APPARATUS FOR CENTRALIZED CONTENT AND DATA DELIVERY", incorporated herein by reference in its entirety.

Moreover, the foregoing embodiments of the CPE 106 may utilize any number of other methods and apparatus in conjunction with the functionality previously described herein in order to further extend its capabilities. See, e.g., co-owned and co-pending U.S. patent application Ser. No. 10/723,959 filed Nov. 24, 2003 entitled "METHODS AND APPARATUS FOR HARDWARE REGISTRATION IN A NETWORK DEVICE"; U.S. patent application Ser. No. 10/773,664 filed Feb. 6, 2004 entitled "METHODS AND APPARATUS FOR DISPLAY ELEMENT MANAGEMENT IN AN INFORMATION NETWORK", and U.S. patent application Ser. No. 10/782,680 filed Feb. 18, 2004 entitled "MEDIA EXTENSION APPARATUS AND METHODS FOR USE IN AN INFORMATION NETWORK", each of the foregoing incorporated herein by reference in its entirety. Myriad other combinations and variations of the CPE 106 will also be recognized by those of ordinary skill given the present disclosure.

Business and Operational "Rules" Engine—

In another aspect of the invention, the aforementioned supervisory process 402 (e.g., rendered as one or more computer programs) optionally includes an operations and/or business rules engine. This engine comprises, in an exemplary embodiment, a series of software routines running on the network device 501 of FIG. 5 or other associated hardware/firmware environment adapted to control the operation of the evaluation and selection algorithms previously described. These rules may also be fully integrated within the supervisory process 402 itself, and controlled via e.g., a GUI on a PC connected to the network device 501. In effect, the rules engine comprises a supervisory entity which monitors and selectively controls, via the supervisory process 402 and/or CPE process 404, the format evaluation and selection functions at a higher level, so as to implement desired operational or business rules. The rules engine can be considered an overlay of sorts to the algorithms of the supervisory process 402 previously described. For example, the supervisory process 402 may invoke certain operational protocols or decision processes based on data received from the CPE 106 (e.g., codec or other equipment and/or software configurations, historical activity data, logged errors, etc.), as well as network operational or historical data, demographic data, geographic data, etc. However, these processes may not always be compatible with higher-level business or operational goals, such as maximizing profit or system reliability. Hence, when imposed, the business/operational rules can be used to dynamically (or manually) control the operation of the supervisory process 402 (and/or client process 404), in conjunction with the operational "recommendations" generated by the supervisory process 402 as part of its analysis, format selection and channel allocation functions previously described.

For example, one rule implemented by the rules engine may comprise selectively servicing (or at least queuing first) requests from certain users first; e.g., those with a higher subscription priority or level under bandwidth-limited cases, and only after this tier of users is satisfied, servicing remaining content requests. In one variant, subscribers are divided into tiers (a hierarchy), and certain tiers of the hierarchy are serviced to a prescribed level first. For instance, one rule might impose a requirement that all "premium" subscribers have their HD program requests serviced before lower-tier subscribers; i.e., selectively skewing bandwidth allocation toward the premium subscribers so long as it would not prevent lower tier subscribers from receiving at least say SD-level service, or service at a prescribed minimum bitrate.

Another rule might allow for the relegation of low-priority requests to the back of the service queue; e.g., those associated with subscribers who have elected to receive content on a less-than-timely or delayed basis (perhaps in exchange for financial or other considerations; see prior discussion provided herein). Such subscribers effectively do not care when they receive the content (within certain constraints, obviously), and hence the MSO can prioritize other requests first.

Similarly, capacity (e.g., bandwidth) for servicing requests can be allocated to those users which, e.g., based on demographics, historical patterns, geographic area, etc. will make best use of the bandwidth in terms of monetary return, profit, or some other business performance metric. For example, the MSO might invoke a business rule that selectively services requests for the best or most lucrative zip codes (or demographic slices) first. Such switching to certain zip codes can be performed using, inter alia, the methods and apparatus set forth in U.S. patent application Ser. No. 11/186,452 entitled "METHOD AND APPARATUS FOR BOUNDARY-BASED NETWORK OPERATION", previously referenced and incorporated herein.

Many other approaches and combinations are envisaged consistent with the invention, as will be recognized by those of ordinary skill when provided this disclosure. An example is the application of business rules based on content or content-provider related metrics versus those of the subscriber. For example, prioritization or servicing of certain requests might be based on one or more features or attributes of the content that is requested (i.e., the genre or type of movie, studio or source identity, actors, subject matter, presence or absence of metadata describing bandwidth profile of the content, etc.) as opposed to purely based on required bandwidth and/or CPE capabilities. In one variant, the supervisory process 402 and the rules engine cooperate to select a format for delivery to certain CPE that: (i) the CPE is capable of decoding; (ii) provides at least a minimum threshold of picture/audio quality; and (iii) maximizes advertising, royalty or other revenue from a third party.

Enforcement of the foregoing business rules may be executed by servers or other devices separately for each service (e.g. BSA or VoD) or centrally via the controlling actions of a master SRM (Session and Resource Manager) or other network agent.

In one embodiment, content providers (e.g., studios, networks, codec manufacturers, etc.) would pay a premium or provide other incentives to the MSO to have particular encodings or formats of their content prioritized. For example, given the "don't care" choice of delivery of the same content encoded in a first format versus another format (assuming generally comparable bandwidth consumption), the MSO may program its rules engine to select the more lucrative of the two formats (i.e., the one for which they receive greater payment or other consideration for using). From an operational standpoint, a similar rule might cause the engine to select the format for which the greatest reliability (e.g., fewest number of crashes, reboot events, trouble reports, etc. have been logged), assuming generally comparable quality and bandwidth required for delivery. This approach gives requesting subscribers the best possible image of the content source (which from a subscriber's perspective may be indistinguishable from the MSO; a user may merely remember e.g., that they could not get the content format (e.g., HD) they wanted on HBO when they wanted it, irrespective of the fact that it may have been the MSO network which caused the delay or format substitution.

Similarly, a more incremental approach can be applied, such as where various formats are "graded" based on profit/revenue and/or operational considerations (i.e., those which earn most and/or give highest reliability, user satisfaction, etc. receive a higher grade), and the bitrate allocated based on such grade(s).

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

What is claimed is:

1. A method of utilizing bandwidth on a content delivery network, comprising:
   evaluating the bandwidth available on said network;
   generating a version of a program said generating based at least in part on said evaluating;
   identifying a plurality of user devices associated with an individual service group of said network and which are capable of utilizing said generated version;
   selectively substituting said generated version of said program for another version of said program for delivery within said individual service group of said network; and
   causing at least a portion of said plurality of user devices to tune said program rendered in said generated version;
   wherein said generated version comprises a version encoded according to a first bitrate, and said another version comprises a version encoded according to a second bitrate, said first and second bitrates being not equal.

2. The method of claim 1, wherein said generated version comprises a lower quality version of said program than said another version, and said selective substituting conserves bandwidth on said network relative to if said substituting was not performed.

3. The method of claim 2, wherein said generated version comprises a standard definition (SD) version, and said another version comprises a high definition (HD) version.

4. The method of claim 1, wherein said act of causing said at least a portion of said plurality of user devices to tune said program rendered in said generated version, thereby reduces instances of duplicate programming delivery in said network.

5. The method of claim 4, wherein said generated version comprises a high definition (HD) version, and said another version comprises a standard definition (SD) version.

6. The method of claim 1, wherein said network comprises a broadcast switched architecture (BSA) network, and said substituting comprises switching off said another version for at least a portion of said individual service group.

7. The method of claim 1, wherein said generated version comprises an AVC encoded format, and said another version comprises an MPEG-2 encoded format.

8. The method of claim 1, wherein:
   said evaluating indicates that available bandwidth on said network is decreasing over time; and
   said generating comprises generating a down-rated version of said program as compared to said another version.

9. The method of claim 1, wherein:
   said evaluating indicates that available bandwidth on said network is increasing over time; and
   said generating comprises generating an up-rated version of said program as compared to said another version.

10. A method of operating a content delivery network to achieve a desired operational goal, comprising:
    delivering a first version of a program to a plurality of user devices associated with a service group of said network, said first version comprising an encoding consuming a first bandwidth;
    providing a second version of said program, said second version being encoded differently than said first version, and said second version comprising an encoding consuming a second bandwidth;
    determining one or more decoding capabilities of said plurality of user devices;
    identifying at least one time where said second version can be substituted for said first version; and
    substituting said second version for said first version at least at said one time so as to achieve said goal;
    wherein said at least one time comprises at least one time when all of said plurality of user devices which are tuned to said first version are capable of decoding said second version; and
    wherein said operational goal comprises either a reduced or an increased bandwidth consumption.

11. The method of claim 10, wherein said operational goal comprises reduced bandwidth consumption, and said second bandwidth comprises an amount less than said first bandwidth.

12. The method of claim 10, wherein said first version comprises an MPEG-2 encoding, and said second version comprises an MPEG-4/H.264 encoding.

13. The method of claim 10, wherein said operational goal comprises increased bandwidth consumption, said first version comprises a standard definition (SD) program, and said second encoding comprises a high definition (HD) program, and said method further comprises tuning a plurality of other user devices of said network to said high definition program after said substitution.

14. The method of claim 13, wherein said at least one time when said second version can be substituted for said first comprises at least one time when all of said plurality of user devices associated with said service group which are tuned to said SD program have HD-capable receivers.

15. The method of claim 10, wherein said second version comprises a bitrate selected based at least in part on the display resolution capabilities of at least one of said plurality of user devices.

16. A server apparatus operating within a content delivery network and configured to deliver a plurality of content programs to a plurality of consumer premises equipment (CPE) in communication therewith, said plurality of CPE being part of a service group, said apparatus comprising:
 a storage entity configured to store said plurality of content programs;
 at least one interface configured to provide said plurality of content programs for delivery to said plurality of CPE; and
 a processor configured to run at least one computer program thereon, said computer program configured to:
  receive information identifying display capabilities of individual ones of said plurality of CPE in said service group; and
  cause switching said individual ones of said plurality of CPE from receiving a first format of a particular program to receiving a second format thereof based at least in part on said information, said first format being encoded differently than said second format.

17. The server apparatus of claim 16, wherein said first format comprises a high definition (HD) format, and said second format comprises a standard definition (SD) format.

18. The server apparatus of claim 16, wherein said computer program is further configured to generate said second format of said particular program.

19. The server apparatus of claim 16, wherein said computer program is further configured to identify an actual or projected shortfall of the bandwidth available on said network, and said act of controllably switching is performed in order to conserve consumed bandwidth so as to at least mitigate said shortfall.

20. The server apparatus of claim 16, wherein said computer program is further configured to determine whether said particular program has a high actual or projected viewership, and in response to said determination, switch said individual ones of said plurality of CPE in said service group from receiving an SD format of said particular program to receiving an HD format thereof.

21. The server apparatus of claim 16, wherein said computer program is further configured to identify at least one of picture or audio quality of said particular program as being a critical attribute, and in response to said identification, switch said plurality of CPE in said service group from receiving an SD format of said particular program to receiving an HD format thereof.

22. The server apparatus of claim 16, wherein said computer program is further configured to remove said first format of said particular program from a plurality of programming being delivered to said service group.

23. The server apparatus of claim 16, wherein said computer program is further configured to perform said switch substantially in response to identifying at least one time where said second format can be substituted for said first format.

24. The server apparatus of claim 23, wherein said at least one time comprises at least one time when all CPE in said service group which are tuned to said first version are capable of receiving said second version.

25. The server apparatus of claim 16, wherein said switching of said individual ones of said plurality of CPE from receiving a first format of a particular program to receiving a second format thereof is further based at least in part on available bandwidth within said content delivery network.

26. The server apparatus of claim 25, wherein said available bandwidth comprises a bandwidth projected for at least some time in the future.

27. The server apparatus of claim 25, wherein said available bandwidth comprises a bandwidth determined or projected using historical data.

28. A method for achieving increasing available bandwidth within a content delivery network, comprising:
 delivering a first encoded version of a program to a first plurality of user devices within a service group of said network, said first encoded version comprising an encoding consuming a first bandwidth;
 delivering a second encoded version of said program to a second plurality of user device of said service group, said second encoded version comprising an encoding consuming a second bandwidth;
 determining one or more decoding capabilities of said first plurality of user devices;
 identifying, based at least in part on said determining, at least one time where said first encoded version can be replaced with said second encoded version for at least said first plurality of user devices;
 replacing said first encoded version with said second encoded version at least at said one time for at least said first plurality of devices; and
 removing said first encoded version from delivery to said service group, said removing increasing the available bandwidth on said network.

29. The method of claim 28, wherein said first encoded version comprises a standard definition (SD) version, and said second encoded version comprises a high definition (HD) version, and said increased availability of bandwidth is achieved without any perceived loss of quality by any of said first plurality or second plurality of user devices.

30. The method of claim 28, wherein said second encoded version comprises a standard definition (SD) version, and said first encoded version comprises a high definition (HD) version, and said increased availability of bandwidth is achieved without significant perceived loss of quality by any of said first plurality of user devices based on said determining of decoding capabilities comprising determining the presence of upconversion capability on said first plurality of user devices.

31. The method of claim 28, wherein said replacing comprises at least one of (i) payload substitution; and/or (ii) re-binding.

32. The method of claim 28, wherein said replacing comprises retuning of said first plurality of user devices to a different program stream.

33. The method of claim 28, wherein said act of replacing said first encoded version with said second encoded version at least at said one time for at least said first plurality of devices is based at least in part on the content of said program.

34. The method of claim 33, wherein when said program is one where at least one of picture or audio quality is considered critical, said replacing said first encoded version with said second encoded version comprising selecting a higher bitrate version of said program.

35. The method of claim 34, wherein said program where at least one of picture or audio quality is considered critical comprises a movie.

* * * * *